(12) United States Patent
Kawabe et al.

(10) Patent No.: US 7,812,917 B2
(45) Date of Patent: Oct. 12, 2010

(54) LIQUID CRYSTAL DISPLAY DEVICE AND METHOD OF MANUFACTURING THE SAME

(75) Inventors: Shinichi Kawabe, Yokohama (JP); Hideyuki Honoki, Yokohama (JP); Yuichiro Tanaka, Hitachinaka (JP)

(73) Assignee: Hitachi Displays, Ltd., Chiba (JP)

( * ) Notice: Subject to any disclaimer, the term of this patent is extended or adjusted under 35 U.S.C. 154(b) by 175 days.

(21) Appl. No.: 12/031,774

(22) Filed: Feb. 15, 2008

(65) Prior Publication Data
US 2008/0204645 A1    Aug. 28, 2008

(30) Foreign Application Priority Data

Feb. 15, 2007 (JP) ............................. 2007-034286
Apr. 6, 2007 (JP) ............................. 2007-100023

(51) Int. Cl.
G02F 1/1337 (2006.01)
G02F 1/1339 (2006.01)

(52) U.S. Cl. ...................... 349/155; 349/123
(58) Field of Classification Search ............... 349/123, 349/155
See application file for complete search history.

(56) References Cited

U.S. PATENT DOCUMENTS

| | | | |
|---|---|---|---|
| 6,396,559 B1 | 5/2002 | Kishimoto et al. | |
| 6,509,948 B2 | 1/2003 | Suzuki | |
| 7,061,568 B2 | 6/2006 | Yamaguchi et al. | |
| 2005/0008606 A1 | 1/2005 | Pawson et al. | |
| 2006/0262252 A1 | 11/2006 | Yonemura et al. | |
| 2007/0019148 A1 | 1/2007 | Ueda | |
| 2007/0019149 A1 | 1/2007 | Kudo et al. | |
| 2007/0097312 A1* | 5/2007 | Park et al. | 349/155 |

FOREIGN PATENT DOCUMENTS

| | | |
|---|---|---|
| JP | 5-216048 | 8/1993 |
| JP | 7-325309 | 12/1995 |
| JP | 8-62606 | 3/1996 |
| JP | 11-142863 | 5/1999 |
| JP | 11-228823 | 8/1999 |
| JP | 2001-83530 | 3/2001 |
| JP | 2003-29195 | 10/2003 |
| JP | 2003-295195 | 10/2003 |
| JP | 2004-37855 | 2/2004 |
| JP | 2004-170537 | 6/2004 |
| JP | 2005-4094 | 1/2005 |
| JP | 2005-37721 | 2/2005 |
| JP | 2005-128357 | 5/2005 |
| JP | 2005-275118 | 10/2005 |
| JP | 2006-10995 | 1/2006 |
| JP | 2006-17982 | 1/2006 |
| JP | 2006-30961 | 2/2006 |
| JP | 2006-53380 | 2/2006 |
| JP | 2006-152247 | 6/2006 |
| JP | 2006-323150 | 11/2006 |
| JP | 2007-25537 | 2/2007 |

* cited by examiner

*Primary Examiner*—Jerry T Rahll
(74) *Attorney, Agent, or Firm*—Antonelli, Terry, Stout & Kraus, LLP.

(57) ABSTRACT

Bead spacers, which are disposed on at least one principal surface of a pair of substrates forming a liquid crystal display device, are bonded to the principal surface by an alignment film or an organic material film. Specifically, the bead spacers disposed on the principal surface are covered with the alignment film, or the bead spacers are bonded by the organic material film to the alignment film formed on the principal surface of the substrate.

5 Claims, 19 Drawing Sheets

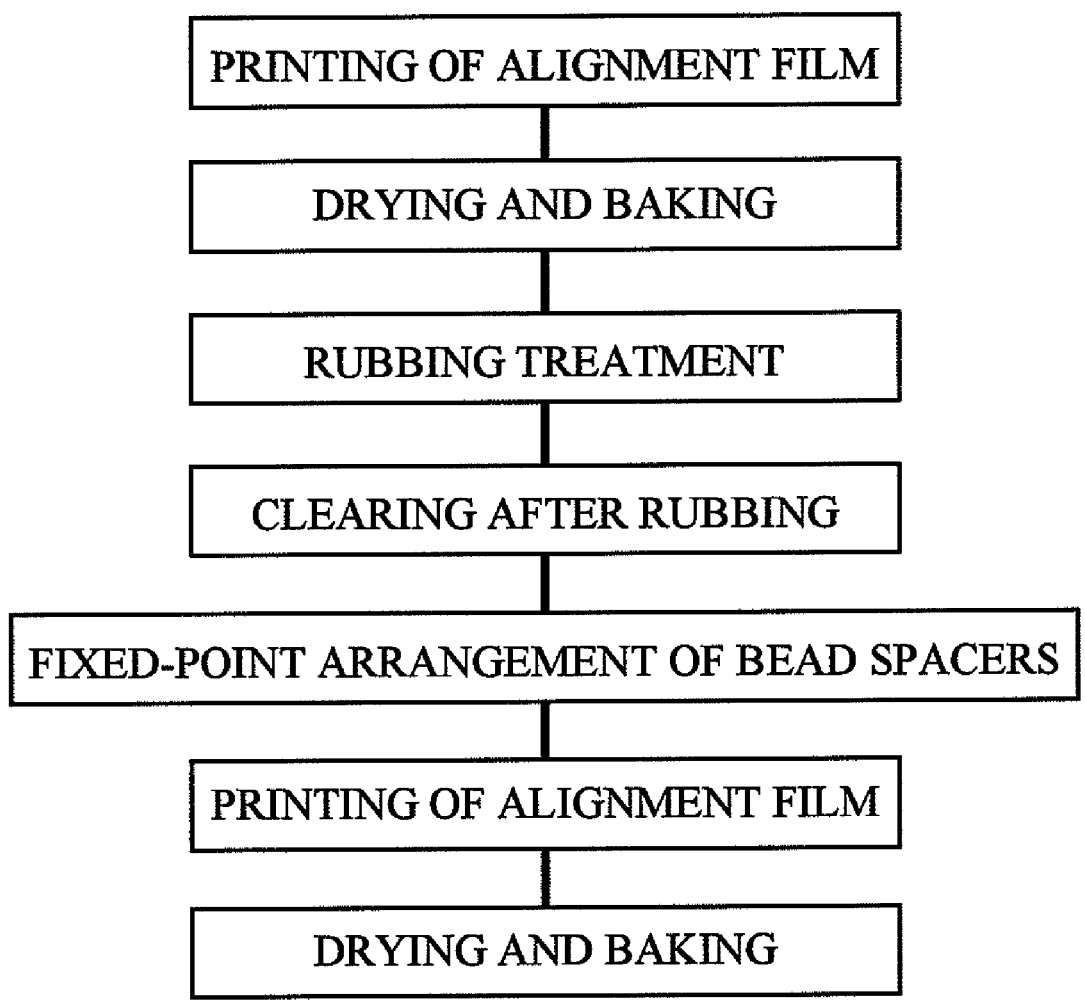

LIQUID CRYSTAL DISPLAY DEVICE AND METHOD OF MANUFACTURING THE SAME

The present application claims priority from Japanese application JP 2007-034286 filed on Feb. 15, 2007, and Japanese application JP 2007-100023 filed on Mar. 6, 2007, the content of which is hereby incorporated by reference into this application.

BACKGROUND OF THE INVENTION

The present invention relates to a structure of a liquid crystal display device (liquid crystal display panel) and a method of manufacturing the liquid crystal display device, and more particularly, to optimization of an arrangement of bead spacers forming a space between a pair of substrates included in the liquid crystal display device.

As shown in FIG. 9, a liquid crystal display panel (liquid crystal display device) 9 is constructed as described below, in which a liquid crystal layer 5 is sandwiched between a pair of (two) substrates typified by a thin film transistor (TFT) substrate 1a, on which thin film transistor is formed and a color filter (CF) substrate 1b on which red, blue, and green color filters 14R, 14G, and 14B are formed; the pair of substrates 1a and 1b are bonded to each other; and the circumferences of the respective substrates are surrounded with a sealing agent and are fixed to each other by bonding.

In the liquid crystal display panel 9, a gap g (hereinafter, referred to as cell gap) between the two substrates 1a and 1b, in which the liquid crystal 5 is sealed, is an important element that determines display quality. In particular, the absolute dimension of the cell gap g and uniformity of the cell gap g over the entire surface of the display area of the liquid crystal display panel 9 are important. Therefore, in the liquid crystal display panel 9 having the above-mentioned structure, in order to keep the gap between the two substrates constant, it is usual to disperse spacers 3 (hereinafter, referred to as bead spacers), which are spherical transparent particles made of glass or a synthetic resin whose grain size is uniform as shown in FIG. 9, between the two substrates to be used.

However, in the liquid crystal display panel having a system involving dispersing the bead spacers 3 on the substrate to be used, fabricating work is performed after dispersing the multiple bead spacers on the substrates. Due to this process, the bead spacers may spill from the substrate at the time of manufacture, which brings about contamination in a production line and becomes a cause of defective products. Moreover, in the liquid crystal display panel whose fabrication is completed, if the bead spacers are inserted into display pixels together with the liquid crystal, the bead spacers displace the liquid crystal. Accordingly, predetermined deflection of light does not occur in that portion, causing a display defect. For example, when the transparent particles are used in the liquid crystal display panel, and the liquid crystal display panel is set to a black display, only the bead spacer portions form luminescent spots.

Moreover, if the bead spacers are present in the display pixels, an arrangement of the liquid crystal molecules in the vicinity of the bead spacers is disturbed, generating light leakage in those portions. This phenomenon leads to occurrence of a problem in that contrast of the liquid crystal display panel is lowered and a detrimental influence is exerted on its display quality. In order to solve the problem, a method is proposed in which columnar spacers 3a (hereinafter referred to as photo-spacers) are provided between the pixel portions on a CF substrate 1b, as shown in FIG. 10 (between non-display areas 15 which separate a plurality of pixels 14, which are light shielding layer portions, hereinafter referred to as the BM portions).

Generally, the photo-spacer 3a is formed by the following methods:
(1) photosensitive resin that will act as a spacer is coated on a principal surface of the substrate by a spin coating method, a slit coating method, printing, or the like so that the photosensitive resin will be of a predetermined thickness;
(2) the photosensitive resin is dried;
(3) using a photomask so that a portion of the spacer has a convex form on the substrate, the photosensitive resin is exposed using an exposure light source through the photomask;
(4) the photosensitive resin is subjected to a developing process, and the photosensitive resin coated on any portion that is not intended to act as the spacer is removed; and
(5) developing solution adhered to the substrate is washed away, and the substrate is dried.

The photo-spacer formed by any of the above-mentioned methods can be arranged in arbitrary positions of the light shielding portion (black matrix, BM) 15 located between pixel portions that do not affect the display quality. As a result, any of the above mentioned methods can prevent lowering of the display quality caused by the light leakage from the photo-spacer portions that are a problem with the bead spacer.

However, in order to form the photo spacers described above on the substrate, the above-mentioned process is necessary, thereby increasing manufacturing cost. Besides, when the heights of the photo spacers are to be made equal to one another over the entire surface of the substrate, there are many technical problems.

Therefore, in recent years, the following technology has been studied. According to the technology, the bead spacers which are used up to now, equal in particle size to one another and made of a synthetic resin, are employed instead of the photo spacers. The bead spacers are not disposed over the substrate at random, but disposed in the light shielding portions which do not affect the display quality and are located between the pixel regions. In this case, an ink jet method or a printing method is used.

Because the bead spacers can be disposed at fixed points, a photolithography process required to form the photo spacers is omitted. Therefore, the photosensitive resin which is the material of the photo spacers and the developer and the cleaning solution which are required for developing processing are omitted, which not only leads to a reduction in cost, but also is effective in establishing a mass production technology that gives consideration to the environment and resources.

Findings with respect to the fixed point arrangement technique for the bead spacers and the fixing strength of the bead spacers are disclosed in Japanese Patent Laid-open Publication No. 2005-037721 (hereinafter, referred to as Patent Document 1), Japanese Patent Laid-open Publication No. 2005-004094 (hereinafter, referred to as Patent Document 2), Japanese Patent Laid-open Publication No. 2004-170537 (hereinafter, referred to as Patent Document 3), Japanese Patent Laid-open Publication No. 2004-037855 (hereinafter, referred to as Patent Document 4), and Japanese Patent Laid-open Publication No. 2006-053380 (hereinafter, referred to as Patent Document 5).

Materials and characteristics of an alignment film to which the bead spacers are disposed are disclosed in Japanese Patent Laid-open Publication No. H 11-228823 (hereinafter, referred to as Patent Document 6), Japanese Patent Laid-open Publication No. 2006-030961 (hereinafter, referred to as Patent Document 7), Japanese Patent Laid-open Publication No. 2005-275118 (hereinafter, referred to as Patent Document 8), Japanese Patent Laid-open Publication No. 2003-295195 (hereinafter, referred to as Patent Document 9), Japanese Patent Laid-open Publication No. 2006-017982 (hereinafter, referred to as Patent Document 10), Japanese Patent Laid-open Publication No. 2006-152247 (hereinafter, referred to as Patent Document 11), and Japanese Patent Laid-open Publication No. 2006-010995 (hereinafter, referred to as Patent Document 12).

SUMMARY OF THE INVENTION

When the bead spacers have been disposed over the substrate between the pixel regions as in the case of the photo spacers, the bead spacers do not affect the display quality. However, in order to maintain such a state, it is necessary to fix the bead spacers on the substrate.

When the bead spacers are to be fixed on the substrate, a method is used involving heating the bead spacers whose surfaces are coated with an adhesive to generate bonding forces between the bead spacers and the substrate, and a method is used involving giving a bonding force to a dispersion liquid used when the bead spacers are dispersed.

However, in the case of the above-mentioned method, the fixing strength of the bead spacers is still insufficient. Therefore, movement of the bead spacers may occur, which should be disposed in portions which do not affect the display quality and are located between the pixel regions, into effective pixels during the assembly process of the liquid crystal display panel. Alternatively, the bead spacers are liable to move into the effective pixels by vibration or the like during transportation or usage of the liquid crystal display panel.

Thus, an object of the present invention is to provide a structure of a liquid crystal display panel in which the bead spacers, which should be disposed in the portions which do not affect the display quality and are located between the pixel regions, are prevented from moving to valid pixels to prevent the display quality from being affected while the liquid crystal display panel is being assembled, carried, or used, and a method of manufacturing the liquid crystal display panel using the bead spacers.

In order to solve the problems and to realize the object of the invention, the following means are used in the present invention.

[Means 1] The bead spacers are disposed on a substrate and then an alignment film, which is necessary for providing a function of aligning directions of liquid crystal molecules to one direction, is applied to an entire surface of the substrate together with the bead spacers.

To attain Means 1, a liquid crystal display device (liquid crystal display panel) according to the present invention includes: a pair of substrates which are bonded so that principal surfaces thereof are opposed to each other across an intervening gap; a plurality of bead spacers which are prepared separately from each of the pair of substrates and disposed between the principals surfaces of the pair of substrates; and a liquid crystal layer in which the gap is filled with liquid crystal molecules, and is characterized in that: one of the pair of substrates includes a display screen of the liquid crystal display panel, which is provided opposite the principal surface of the one of the pair of substrates, and the display screen includes a plurality of pixels which are two-dimensionally provided to control light transmittance of the liquid crystal layer for each of the plurality of pixels; the plurality of bead spacers are disposed in a region of at least one of the principal surfaces of the pair of substrates, the region being opposed (an opposite) to an on-display portion provided between the plurality of pixels of the display screen; the at least one of the principal surfaces of the pair of substrates includes an alignment film which aligns the liquid crystal molecules and an organic film which is different in composition from the alignment film and covered with the alignment film in the region, the alignment film and the organic film being formed on the at least one of the principal surfaces of the pair of substrates; and the plurality of bead spacers are adhered to each of the alignment film and the organic film and held in the region.

The organic film includes, for example, one of an organic substance having a higher surface tension than an organic substance contained in the alignment film and organic molecules derived from the organic substance having a higher surface tension Further, the alignment film includes a first organic substance and a second organic substance which are different from a resin which forms the alignment film, the first organic substance is one of a first organic solvent and organic molecules derived from the first organic solvent, the second organic substance is one of a second organic solvent having a higher surface tension than the first organic solvent and organic molecules derived from the second organic solvent, and the organic film includes a first organic substance and a second organic substance and a ratio of the second organic substance to the first organic substance in the organic film is higher than a ratio of the second organic substance to the first organic substance in the alignment film.

Further, each of the alignment film and the organic film is formed of the same resin film, and the alignment film and the organic film are different from each other by at least one of an organic substance which is contained in the resin film and is different from the resin film and a content ratio of the organic substance Besides, according to the present invention, a method of manufacturing a liquid crystal display device (liquid crystal display panel) including a first substrate and a second substrate in which principal surfaces thereof are opposed to each other across an intervening gap and a liquid crystal layer is held between the principal surfaces, and an alignment film which is formed on the principal surface of the first substrate and aligns liquid crystal molecules contained in the liquid crystal layer, includes: a first step of landing a plurality of bead spacers which are prepared separately from the first substrate and the second substrate, together with a dispersion liquid, on a non-display portion located between pixels of the principal surface of the first substrate; a second step of applying a solution containing a precursor of the alignment film to the principal surface of the first substrate; and a third step of curing an applied film of the solution containing the precursor to form the alignment film, the first step, the second step, and the third step being performed in the stated order, in which: the dispersion liquid contains a solvent left to the principal surface of the first substrate when the second step is started; and the solvent is prepared to exhibit a surface tension larger than a surface tension of the solution containing the precursor.

In the second step, the solution containing the precursor is applied to cover the plurality of bead spacers.

[Means 2] When the bead spacers are disposed on the substrate applied with the alignment film, which is necessary for providing the function of aligning the directions of the liquid crystal molecules to one direction, a resin material (for example, the same material as that of the alignment film which is already applied to the substrate) is applied to the principal surface of the substrate so as to cover the bead spacers.

To attain Means 2, a liquid crystal display device (liquid crystal display panel) according to the present invention includes: a pair of substrates which are bonded so that principal surfaces thereof are opposed to each other across an intervening gap; a plurality of bead spacers which are prepared separately from each of the pair of substrates and disposed between the principal surfaces of the pair of substrates; and a liquid crystal layer in which the gap is filled with a liquid crystal molecule, in which: one of the pair of substrates includes a display screen of the liquid crystal display, which is provided opposite the principal surface of the one of the pair of substrates, and the display screen includes a plurality of pixels which are two-dimensionally provided to control light transmittance of the liquid crystal layer for each of the plurality of pixels; at least one of the pair of substrates includes an alignment film which aligns the liquid crystal molecules which are formed on the at least one of the principal surfaces of the pair of substrates; and the plurality of bead spacers is disposed in a region which is located on the alignment film and opposed to a non-display portion provided between the plurality of pixels of the display screen, adhered to an organic film which is different in composition from the alignment film and adhered to the alignment film in the region, and held in the region.

The organic film is formed of a resin different in composition from a resin contained in the alignment film. Further, each of the alignment film and the organic film is formed of the same resin film; and the alignment film is different from the organic film in at least one of an organic substance, which is contained in the resin film and is other than the resin film, and a content ratio of the organic substance.

According to the present invention, a method of manufacturing a liquid crystal display device (liquid crystal display panel) including a first substrate and a second substrate in which principal surfaces thereof are opposed to each other across an intervening gap and a liquid crystal layer is held between the principal surfaces, a plurality of pixels which are two-dimensionally arranged on the principal surface of the first substrate, a non-display portion located between the plurality of pixels, and an alignment film formed on the principal surface of the first substrate, for aligning liquid crystal molecules contained in the liquid crystal layer, includes: a first step of applying a solution containing a precursor of the alignment film to the principal surface of the first substrate to form an applied film of the solution containing the precursor on the principal surface of the first substrate and performing one of drying and baking the applied film to form the alignment film; a second step of landing a plurality of bead spacers which are prepared separately from the first substrate and the second substrate, together with a dispersion liquid, on a region of the alignment film which covers the non-display portion; and a third step of covering the plurality of bead spacers with an organic material liquid including one of a resin material for fixedly bonding the plurality of bead spacers to the region of the alignment film and a precursor of the resin material and performing drying and baking the organic material liquid, the first step, the second step, and the third step being performed in the stated order. Each of the dispersion liquid and organic material liquid is prepared to exhibit a surface tension higher than a surface tension of the solution containing the precursor of the alignment film.

Further, the organic material liquid includes, as the precursor of the resin material, the precursor of the alignment film which is included in the solution containing the precursor. Further, between the first step and the second step, rubbing treatment is performed on the alignment film.

According to the present invention, in addition to the above-mentioned method, there is provided a method of manufacturing a liquid crystal display device including a first substrate and a second substrate in which principal surfaces thereof are opposed to each other across an intervening gap and a liquid crystal layer is held between the principal surfaces, a plurality of pixels which are two-dimensionally arranged on the principal surface of the first substrate, a non-display portion located between the plurality of pixels, and an alignment film which is formed on the principal surface of the first substrate and aligns liquid crystal molecules contained in the liquid crystal layer, the method including: a first step of applying a solution containing a precursor of the alignment film to the principal surface of the first substrate to form an applied film of the solution containing the precursor on the principal surface of the first substrate and performing one of drying and baking the applied film to form the alignment film; and a second step of landing a plurality of bead spacers which are prepared separately from the first substrate and the second substrate, together with a dispersion liquid, to a region of the alignment film which covers the non-display portion, the first step and the second step being performed in the stated order. The dispersion liquid is prepared to include one of a resin material for fixedly bonding the plurality of bead spacers to the region of the alignment film and a precursor of the resin material and exhibit a surface tension higher than a surface tension of the solution containing the precursor of the alignment film. The dispersion liquid is dried and baked in the second step.

According to the present invention, there is further provided a liquid crystal display device, including: a first substrate and a second substrate which are bonded to each other; a first bead spacer which is disposed in a first portion on the first substrate and is brought into contact with the second substrate, the first portion being raised in a direction opposed to the second substrate; and a second bead spacer which is disposed in a second portion of the first substrate which is thinner than the first portion.

According to the present invention, the bonding force of the bead spacer to the substrate of the liquid crystal display device is improved, so the shifting of the bead spacer during the assembly, carrying, or use of the liquid crystal display device is suppressed. Therefore, the bead spacer disposed in a region which is located between pixel regions and does not affect the display quality (non-display portion) is prevented from moving into the pixel regions to prevent faulty display.

Even when a bead spacer which has been conventionally known is to be used, the bead spacer is bonded to the non-display portion of the principal surface of the substrate by an organic material film used for, for example, the alignment film. In this case, during a process of printing the alignment film to the principal surface of the substrate and drying the alignment film, a process of installing the liquid crystal display device including the substrate to a frame or the like, the carrying or use of the liquid crystal display device, or the like, the risk of the bead spacer being broken (elastically deformed) by an external force applied thereto significantly reduces. This may be because the alignment film or the organic material film which are used to hold the bead spacer to the principal surface of the substrate absorbs an external force applied to the bead spacer because of its flexibility. Therefore, a change in cell gap of the liquid crystal display device, which is caused by the deformation or breakage of the bead spacer, is suppressed to reduce the rate of occurrence of a defective product. The bead spacer supported by the organic material film absorbs the external force applied to the bead spacer by elastic deformation in a wide area, which is caused by a self-reaction force. Thus, a high-quality liquid crystal display device can be mass-produced at high yield.

BRIEF DESCRIPTION OF THE DRAWINGS

In the accompanying drawings:

FIG. 4 is a flow chart showing a process of manufacturing the liquid crystal display device (CF substrate) according to Example 2 of the present invention;

DESCRIPTION OF THE PREFERRED EMBODIMENTS

First Embodiment

Figure 1A:
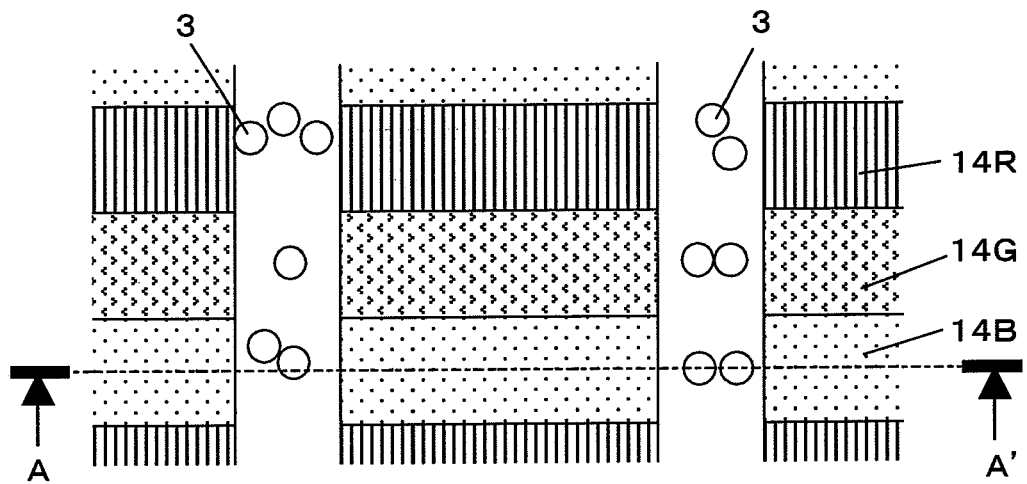
FIG. 1A is a plan view.

Principal constituent elements of a liquid crystal display device according to the present invention will be described in detail before the detailed descriptions of a structure of the liquid crystal display device according to the present invention and a method of manufacturing the same, to make features of the present invention clear, which will be described later.

Material of Bead Spacer 3

A spherical or cylindrical "piece (chip)" used as a spacer is made of an inorganic material such as silica or an organic material such as plastic. The piece made of the organic material is also called a plastic bead. In particular, the piece made of an organic polymer has a suitable hardness such that a resin layer, such as an alignment layer which is brought into contact therewith, is not damaged, easily follows a change in thickness which is caused by thermal expansion or thermal shrinkage, and has a relatively small movement inside the liquid crystal display device. The organic polymer forming the plastic beads may be obtained by polymerizing a mixture of, for example, a monofunctional monomer typified by: styrene derivatives such as styrene, α-methylstyrene, and p-chlorostyrene; vinylesters such as vinyl acetate and vinyl propionate; and (meth)acrylate derivatives such as methyl(meth)acrylate, trifluoroethyl (meth)acrylate, and cyclohexyl (meth) acrylate; and a polyfunctional monomer typified by: divinyl benzene, trimethylol propane tri(meth)acrylate, tetramethylol methane tri(meth)acrylate, diallylphthalate, pentaerythritol tri(meth)acrylate, and polyethylene glycol di(meth)acrylates such as ethyleneglycol di(meth)acrylate; and polypropylene glycol di(meth)acrylates such as propylene glycol di(meth)acrylate.

It is desirable to use the plastic bead as the spacer (bead spacer) 3 described later, and the shape thereof is not limited to a spherical or cylindrical shape.

Dispersion Liquid of Bead Spacer 3

It is preferable to use a water-soluble or hydrophilic liquid as a medium of a spacer dispersion liquid. When spacers are disposed by an ink jet head (ink jet nozzle) to the surface of an alignment film made of a polyamide resin, a polyimide resin, or the like, it is desirable to use, as the medium, a solvent which does not contaminate the alignment film with foreign matter, that is, a solvent which does not easily enter the alignment film and dissolve in the alignment film. Even in the case of screen printing to a principal surface of a substrate, the spacer dispersion liquid is printed on the principal surface without clogging openings formed on a screen printing plate, thereby disposing the bead spacers 3 to a desired position within the principal surface with high precision.

When droplets are ejected from the ink jet nozzle to an object to be processed (in this embodiment, the surface of a thin film formed on the substrate, hereinafter referred to as specimen), a desirable surface tension of a solution of the droplets in an atmosphere of 20° C. is within a range which is equal to or larger than 30 mN/m and equal to or smaller than 50 mN/m, and a desirable viscosity thereof is within a range which is equal to or larger than 0.5 mPa·s and equal to or smaller than 15 mPa·s. In the specification of this application, the surface tension is expressed by a unit of mN/m (millinewton/meter). This value is also expressed by a unit of dyne/cm (dyne/centimeter). A surface tension of 1 mN/m is also expressed as 1 dyne/cm. In the specification of this application, the viscosity is expressed by a unit of mPa·s (millipascal·second). This value is also expressed by a unit of cp (centipoise). A viscosity of 1 mPa·s is also expressed as 1 cp. The desirable surface tension value and viscosity value of the liquid ejected from the inkjet nozzle are changed according to each reference. For example, Patent Document 5 describes that the desirable surface tension in the atmosphere of 20° C. is within a range which is equal to or larger than 20 mN/m and equal to or smaller than 50 mN/m, and the desirable viscosity thereof is within a range which is equal to or larger than 0 (zero) mPa·s and equal to or smaller than 50 mPa·s.

Patent Document 4 proposes to prepare the medium of the spacer dispersion liquid as a mixture of at least two kinds of solvents whose boiling points are different from each other. One of the two kinds of solvents has a higher boiling point than a boiling point of the other thereof. In this specification, hereinafter, unless otherwise specified, the former is referred to as a "high-boiling point solvent" and the latter is referred to as a "low-boiling point solvent." A solvent whose boiling point is equal to or higher than 150° C. is desirably used as the high-boiling point solvent. For example, an ink solvent used to form an alignment film by an ink jet method can be utilized. Examples of such a kind of ink solvent as described in Patent Document 6 and Patent Document 7 include N-methyl-2-pyrrolidinone (surface tension=41 mN/m, boiling point = 204° C., hereinafter abbreviated as NMP), γ-butyrolactone (surface tension=43.9 mN/m, boiling point=203° C., hereinafter abbreviated as GBL), 2-n-butoxyetanol (which is also called n-butyl cellosolve, surface tension=27.4 mN/m, boiling point=171° C., hereinafter abbreviated as BC), N,N-dimethylacetamide (surface tension=32 mN/m, boiling point=166° C., hereinafter abbreviated as DMA), and diethylene glycol diethyl ether (surface tension=25 mN/m, boiling point=189° C.).

Meanwhile, a solvent whose boiling point is equal to or lower than 100° C. is desirably used as the low-boiling point solvent. For example, it is possible to utilize deionized water, lower alcohol such as ethanol (boiling point is 78.3° C.), n-propanol (boiling point is 97.2° C.), or 2-butanol (boiling point is 100° C.), lower alkyl ether such as diethyl ether (boiling point is 35° C.) or isopropyl ether (boiling point is 69° C.), alkyl ester such as methyl acetate (boiling point is 56° C.), and ketone such as acetone (boiling point is 56.5° C.)

Structure of Liquid Crystal Display Device

In order to clarify the structure of the substrate having the principal surface to which the above-mentioned spacer dispersion liquid is dropped from the ink jet nozzle or printed, the structure of the liquid crystal display device according to the present invention will be described with reference to FIGS. 5A and 5B, and FIGS. 6A and 6B.

Figure 5A:
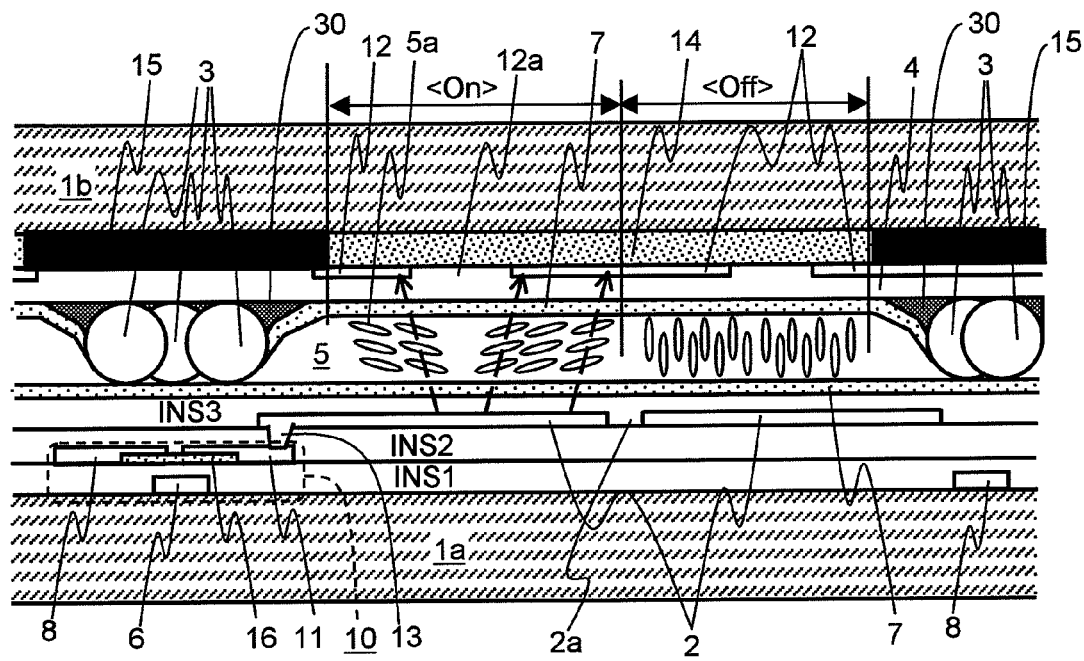
FIGS. 5A and 5B are a plan view and a cross sectional view showing structures of pixel and peripheral regions of a liquid crystal display device (VA type) according to the present invention.
Figure 5B:
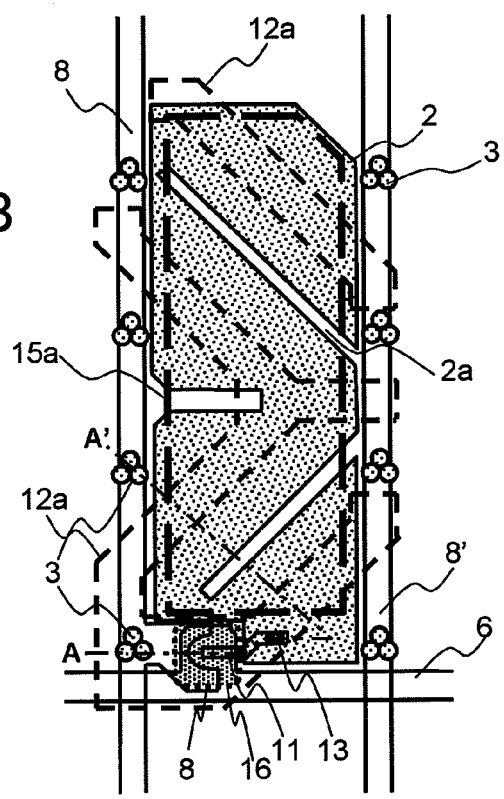
Figure 6A:
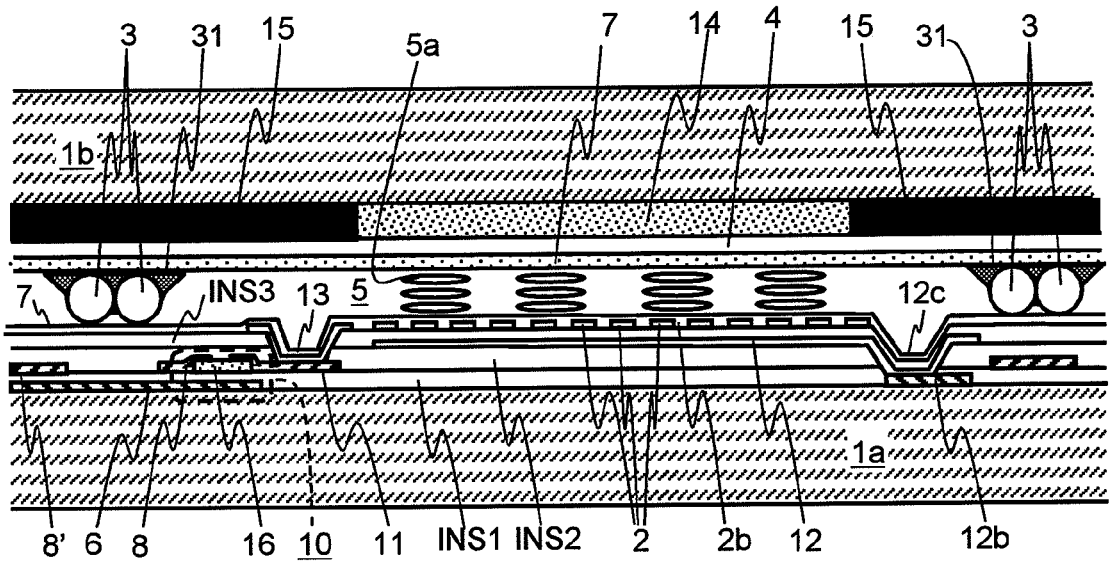
FIGS. 6A and 6B are a plan view and a cross sectional view showing the structure of the pixel and peripheral regions of a liquid crystal display device (IPS type) according to the present invention.
Figure 6B:
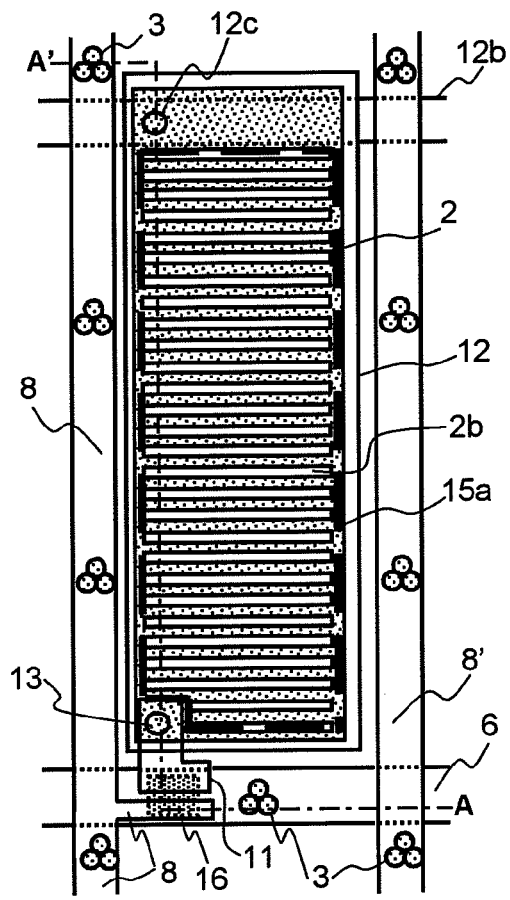

FIGS. 5A and 5B show an example of a pixel of a liquid crystal display device of a vertical alignment (VA) type. FIG. 5A is a cross sectional view showing the liquid crystal display panel taken along the A-A' line of a planar structure of the pixel shown in FIG. 5B. FIGS. 6A and 6B show an example of a pixel of a liquid crystal display device of an in-plane-switching (IPS) type. FIG. 6A is a cross sectional view showing the liquid crystal display panel taken along the A-A' line of a planar structure of the pixel shown in FIG. 6B.

In each of the liquid crystal display devices, a pair of substrates 1a and 1b are bonded to each other at respective peripheral regions thereof by a sealing agent. Liquid crystal molecules 5a indicated by an ellipse corresponding to a refractive index anisotropy are sealed in a space which is located between the substrates and surrounded by the sealing agent, to produce a liquid crystal layer 5. Because a thin film transistor (TFT) 10 is formed on a principal surface opposed to the liquid crystal layer 5, one of the pair of substrates, the substrate 1a is referred to as a TFT substrate in this specification for convenience. Because a color filter (CF) 14 is formed on a principal surface opposed to the liquid crystal layer 5, the other of the pair of substrates, the substrate 1b is referred to as a CF substrate in this specification for convenience. In another example of the liquid crystal display device to which the present invention is applied, thin film transistor 10 and the color filter 14 may be formed on the principal surface of the TFT substrate 1a and a light shielding film (black matrix (BM)) 15 which separates pixels may be formed on the principal surface of not the CF substrate 1b but the TFT substrate 1a. A region to which the light shielding film 15 is formed or a region opposed to the region on the principal surface of the CF substrate 1b and a display screen surface including the principal surface thereof, of the liquid crystal display device is also referred to as a "non-display region".

The spacers 3 ejected from the ink jet nozzle together with the spacer dispersion liquid are disposed on at least one of the principal surfaces of the pair of substrates. In the following description, the principal surface of the CF substrate 1b is representative. Even when the spacers 3 are printed on the principal surface of the CF substrate 1b together with the spacer dispersion liquid, the liquid crystal display device exhibits the cross sectional structure as shown in FIG. 5A or 6A. Therefore, the description of the spacers 3 disposed (printed) on the principal surface of the CF substrate 1b by a printing method will be omitted.

Each of FIGS. 5B and 6B fundamentally shows the planar structure of the single pixel on the principal surface of the TFT substrate 1a. Openings (outlines) 15a of the light shielding film 15 formed on the CF substrate 1b and openings (outlines) 12a of a common electrode 12 of the liquid crystal display device of the VA type are also shown as broken-line boxes projected to the planar structure. A plurality of pixels shown in FIG. 5B is arranged in a two-dimensional shape (for example, matrix shape) on the principal surface of the TFT substrate 1a of the VA type liquid crystal display device to construct a display region. A plurality of pixels shown in FIG. 6B is arranged in the two-dimensional shape (for example, matrix shape) on the principal surface of the TFT substrate 1a of the IPS type liquid crystal display device to construct a display region. The sealing agent is formed to surround each of the display regions.

In each of the VA type liquid crystal display device and the IPS type liquid crystal display device, the thin film transistor 10 and a pixel electrode 2 to which carriers (electrons or holes) are supplied therethrough are formed for each pixel above the principal surface of the TFT substrate 1a. The thin film transistor 10 includes: a gate electrode (scanning signal line) 6 formed on the TFT substrate 1a made of a material whose light transmittance is high (hereinafter referred to as transparent material), such as glass or plastic; a first insulating film (gate insulating film) INS1 which covers the gate electrode 6 and is made of silicon oxide or silicon nitride; a semiconductor film 16 formed on a region of the first insulating film INS1, which is located above at least the gate electrode 6; a source electrode (video signal line) 8 which is brought into contact with one end of the semiconductor film; and a drain electrode 11 which is brought into contact with the other end of the semiconductor film. The source electrode extends in a first direction (longitudinal direction) within the principal surface of the TFT substrate 1a and is connected with one of the plurality of video signal lines 8 arranged in a second direction (lateral direction) crossing the first direction, or is provided as a part of the one of the video signal lines 8. The gate electrode extends in the second direction (lateral direction) within the principal surface of the TFT substrate 1a and is connected with one of the plurality of scanning signal lines 6 arranged in the first direction (longitudinal direction), or is provided as a part of the one of the scanning signal lines 6. The carriers to be supplied to the pixel electrode 2 are inputted to the thin film transistor 10 provided to a "pixel" including the pixel electrode 2 through one of the plurality of scanning signal lines 6, which corresponds to the pixel electrode 2. When a scanning signal (voltage signal) is applied to one of the plurality of scanning signal lines 6, which corresponds to the thin film transistor 10 or the gate electrode connected with the one of the plurality of scanning signal lines 6, the carriers are supplied to the pixel electrode 2 through the semiconductor film 16 and the drain electrode 11 of the thin film transistor 10. A second insulating film INS2 covering the thin film transistor 10 is made of an inorganic material such as silicon oxide or silicon nitride, or an organic material such as a resin, and also called an interlayer insulating film because of the arrangement in which the thin film transistor 10 and the pixel electrode 2 corresponding thereto are separated from each other. The thin film transistor 10 (drain electrode 11) and the pixel electrode 2 are electrically connected with each other through a contact hole 13 passing through the second insulating film INS2. A third insulating film INS3 is made of an inorganic material or an organic material as in the case of the second insulating film INS2. When a process of forming an alignment film 7 made of polyimide on the third insulating film INS3 and light transmittance are taken into account, it is preferable to use an acrylic resin as the organic material. The third insulating film INS3 serves as a planarizing film for reducing the unevenness caused by the pixel electrode 2 in the case of FIG. 5A and serves as an interlayer insulating film for electrically insulating the pixel electrode 2 from the common electrode 12 in the case of FIG. 6A.

In the VA type liquid crystal display device, the common electrode 12 is formed on the CF substrate 1b. In a light transmission region for each pixel (specified by, for example, the openings 15a of the light shielding film 15 or an outline of the color filter 14), at least one of a slit, a cutaway, and an opening is provided to the common electrode 12. Hereinafter, the slit or the cutaway is also referred to as "the opening 12a of the common electrode." When the opening 12a of the common electrode is opposed to the pixel electrode 2, an electric field (indicated by a broken-line arrow of an <On> area of FIG. 5A) generated between the electrodes is tilted at a predetermined angle relative to a direction in which the pair of substrates 1a and 1b are spaced (hereinafter referred to as cell gap). When no electric field is generated between the pixel electrode 2 and the common electrode 12, the liquid crystal molecules 5a having a uniaxial birefringence are initially aligned such that the molecular axis (long axis) is matched with the cell gap (see an <Off> area of FIG. 5A). The initial alignment of the liquid crystal molecules 5a or the like is called "vertical alignment (VA)", in which light passing through the liquid crystal layer 5 is blocked. The molecular axis of the vertically aligned liquid crystal molecules 5a is tilted relative to the cell gap according to the strength of the electric field between the pixel electrode 2 and the common electrode 12. The amount of light passing through the liquid crystal layer 5 increases with an increase in tilt. It is unnecessary to form the slit, the cutaway, or the opening in the pixel electrode 2 unlike the common electrode 12. As shown in FIG. 5B, cutaways 2a may be formed so as not to be opposed to the openings 12a of the common electrode. The plurality of cutaways 2a having different extension directions and the plurality of openings 12a having different extension directions are provided in the pixel electrode 2 and the common electrode 12 shown in FIG. 5B, respectively, so the viewing angle characteristic of the VA type liquid crystal display device is further improved. The liquid crystal display device having the pixel structure as described above is also called a multi-domain vertical alignment (MVA) type.

In the IPS type liquid crystal display device, the common electrode 12 is formed on the TFT substrate 1a, so it is unnecessary to dispose electrodes to the CF substrate 1b. The pixel electrode 2 exhibits, for example, a comb-tooth shape because of the formation of the plurality of slits, cutaways, or openings. The pixel electrode 2 shown in FIG. 6B has a grid shape in which a plurality of openings 2b is arranged. The common electrode 12 shown in FIG. 6B is formed for each pixel as a single solid film opposed to the pixel electrode 2 and the openings 2b thereof. The common electrode 12 is formed between the principal surface of the TFT substrate 1a and the pixel electrode 2, and electrically connected with a common line 12b extending in the second direction (lateral direction) through a contact hole 12c.

In each of the liquid crystal display devices shown in FIGS. 5A and 5B, and FIGS. 6A and 6B, the pixel electrode 2 and the common electrode 12 each are made of transparent conductive oxide such as indium tin oxide (ITO), indium zinc oxide (IZO), antimony-doped tin oxide (ATO), or aluminum-doped zinc oxide.

The CF substrate 1b used for the VA type liquid crystal display device has substantially the same structure as the CF substrate 1b used for the IPS type liquid crystal display device, except for the point that the common electrode 12 is formed. The color filter 14 and the light shielding film 15 are formed on the principal surface of the CF substrate 1b made of a transparent material such as glass or plastic. The color filter 14 is made of a resin material including at least one of, for example, a pigment, a dye, and a fluorescent material. The light shielding film 15 is made of a material whose light transmittance is lower (hereinafter referred to as non-transparent material) than the light transmittance of each of the CF substrate 1b and the color filter 14. The light shielding film 15 is formed as a thin film made of metal such as chromium (Cr) and an alloy thereof, or as a resin thin film in which particles having a high light absorption factor, such as carbon particles, cobalt oxide particles, or black pigment particles are dispersed. An insulating film 4 serves as a planarizing film for reducing the unevenness of the principal surface of the CF substrate 1b, which is caused by the color filters 14 and the light shielding films 15 located between the color filters 14. The insulating film 4 is made of an inorganic material or an organic material as in the case of the third insulating film INS3. When a process of forming the alignment film 7 on the insulating film 4 and light transmittance are taken into account, the insulating film 4 is preferably made of an acrylic resin.

In each of the liquid crystal display devices shown in FIGS. 5A and 5B and FIGS. 6A and 6B, the bead spacers 3 for determining the gap spaced between the pair of substrates 1a and 1b (cell gap) are disposed in a portion of the principal surface of the CF substrate 1b, which is covered with the light shielding film 15. The bead spacers 3 may be disposed in a portion of the principal surface of the TFT substrate 1a which is opposed to the light shielding film 15. The bead spacers 3 may be disposed in the portion of the principal surface of the CF substrate 1b and the portion of the principal surface of the TFT substrate 1a so as not to overlap with one another. In each of the liquid crystal display devices, the alignment film 7 is formed as follows. A solution containing precursors of the alignment film is applied onto an upper surface of each of base films (insulating film 4 and third insulating film INS3) and the precursor is made to react while a solvent is evaporated from the solution. A polyimide resin generally used as a material of the alignment film 7 is synthesized by the following polymerization reaction between tetracarboxylic dianhydride and diamine which are the precursors.

[Chemical formula 1]

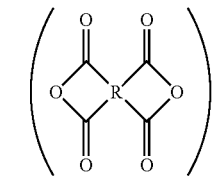 + 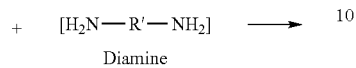 ⟶

Tetracarboxylic Dianhydride    Diamine

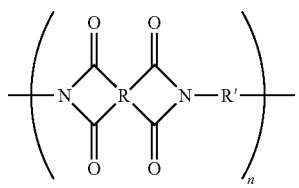

Polyimide (n is repetition number (natural number))

As the tetracarboxylic dianhydride serving as a polyimide resin precursor, for example, pyromellitic dianhydride (represented by the molecule structure [2-1], and hereinafter, abbreviated as PMDA), 3,3',4,4'-biphenyltetracarboxylic acid dianhydride (represented by the molecule structure [2-2], and hereinafter, abbreviated as BPDA), 3,3',4,4'-benzophenone tetracarboxylic dianhydride (represented by the molecule structure [2-3], and hereinafter, abbreviated as BTDA), 1,2,3,4-cyclobutanetetracarboxylic dianhydride (represented by the structure [2-4], and hereinafter, abbreviated as CBDA), 3,4-dicarboxy-1,2,3,4-tetrahydro-1-naphthalenesuccinic acid dianhydride (represented by the molecule structure [2-5], and hereinafter, abbreviated as TDA), 2,3,5-tricarboxycyclopentyl acetic dianhydride (represented by the molecule structure [2-6], and hereinafter, abbreviated as TCA), and 1,2-dimethyl-1,2,3,4-cyclobutane-tetracarboxylic dianhydride (represented by the structure [2-7], and hereinafter, abbreviated as DMCB) are used.

[Chemical formula 2]

[2-1]

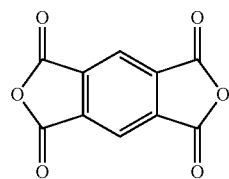

PMDA

[2-2]

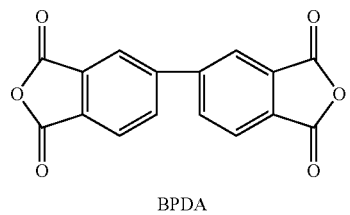

BPDA

[2-3]

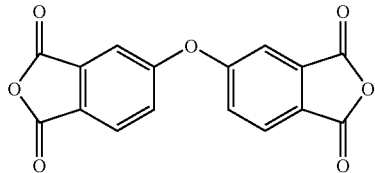

BTDA

[2-4]

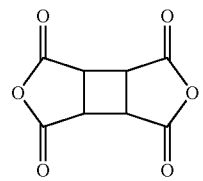

CBDA

[2-5]

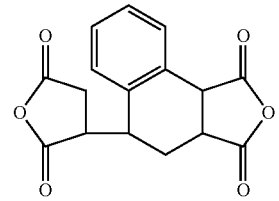

TDA

[2-6]

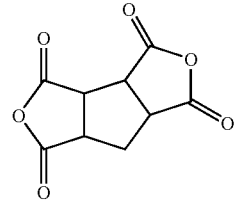

TCA

[2-7]

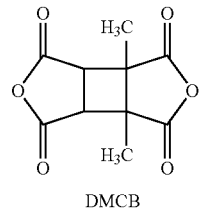

DMCB

On the other hand, as the diamine serving as a polyimide resin precursor, for example, 4,4'-diaminodiphenyl ether, (represented by the molecule structure [3-1], and hereinafter, abbreviated as DDE), p-phenylenediamine (represented by the structure [3-2], and hereinafter, abbreviated as PDA), 2,2-bis[4-(4-aminophenoxy)phenyl]propane (represented by the molecule structure [3-3], hereinafter, abbreviated as BAPP), 4,4'-diaminodiphenylmethane (represented by the molecule structure [3-4], and hereinafter, abbreviated as DDM), m-xylylene diamine (represented by the molecule structure [3-5], and hereinafter, abbreviated as MXDA), and 2,2'-dimethyl-4,4'-diamino biphenyl (represented by the molecule structure [3-6], and hereinafter, abbreviated as MDB) are used.

[Chemical formula 3]

[3-1]
DDE

[3-2]
PDA

[3-3]
BAPP

[3-4]
DDM

[3-5]
MXDA

[3-6]
MDB

Further, a diamine specialized in polymerization of a polyimide resin is disclosed in Patent Document 8, Patent Document 9, and Patent Document 10. Hereinafter, in this specification, 1,1'-bis{4-[(4-aminophenyl)methyl]phenyl}-4-n-hexylcyclohexane (represented by the molecule structure [4-1]) disclosed in Patent Document 8 is represented as diamine A and 5-{4-[2-(4-n-hexylcyclohexyl)ethyl]cyclohexyl}phenylmethyl 1,3-diaminobenzene (represented by the molecule structure [4-2]) disclosed in Patent Document 8 is represented as diamine B.

[Chemical formula 4]

[4-1]
Diamine A

[4-2]
Diamine B

A substance having a molecular structure [5-1] which is disclosed in Patent Document 9 and Patent Document 10, a substance having a molecular structure [5-2] which is disclosed in Patent Document 9, and a substance having a molecular structure [5-3] which is disclosed in Patent Document 10 are represented by Diamine C, Diamine D, and Diamine E, respectively.

[Chemical formula 5]

[5-1]
Diamine C

[5-2]
Diamine D

[5-3]
Diamine E

Composition examples of the precursor solution of the polyimide resin which contains tetracarboxylic dianhydride and diamine as disclosed in Patent Document 6, Patent Document 8, Patent Document 9, Patent Document 10, and Patent Document 11 are shown in Table 1, and represented as Reagent Nos. 1 to 17 for respective compositions.

TABLE 1

Table 1

| Reagent | Tetracarboxylic Dianhydride | Diamine | Solvent | Viscosity (mPa·s) | Reference |
|---|---|---|---|---|---|
| No. 1 | PMDA | DDE | NMP, DMA | 30 | Patent Document 6 |
| No. 2 | BPDA | PDA | NMP, DMA | 45 | Patent Document 6 |
| No. 3 | BTDA | BAPP | NMP, DMA | 60 | Patent Document 6 |
| No. 4 | PMDA, CBDA | Diamines A + B | NMP, BC | 37.6 | Patent Document 8 |
| No. 5 | TDA | Diamines A + B, DDM | NMP, BC | 6 | Patent Document 8 |
| No. 6 | PMDA, CBDA | DDM, PDA | NMP, BC | 22 | Patent Document 8 |
| No. 7 | PMDA, CBDA | MXDA | NMP, BC, GBL | 20 | Patent Document 11 |
| No. 8 | CBDA + (PMDA, TCA) * | MDB + (BAPP) * |  | 10 | Patent Document 9 |
| No. 9 | PMDA, CBDA | BAPP, DDE, Diamine C |  | 10 | Patent Document 9 |
| No. 10 | PMDA, DMCB | BAPP |  | 10 | Patent Document 9 |
| No. 11 | PMDA, CBDA + (TCA) * | DDE + (PDA, Diamine C) * |  | 10 | Patent Document 9 |
| No. 12 | PMDA, CBDA + (TCA) * | DDE + (PDA, Diamine D) * |  | 10 | Patent Document 9 |
| No. 13 | PMDA, TCA | PDA, Diamine E | BC, NMP | 6 | Patent Document 10 |
| No. 14 | PMDA, TCA | PDA, Diamine E | BC, NMP, DEDG | 6 | Patent Document 10 |
| No. 15 | TCA | PDA, Diamine E |  | 8 | Patent Document 10 |
| No. 16 | PMDA, TCA | PDA, Diamine C |  | 11 | Patent Document 10 |
| No. 17 | TCA | PDA, Diamine E |  | 10 | Patent Document 10 |

Patent Document 8 discloses Reagent Nos. 4 to 6 suitable for the VA type liquid crystal display device shown in FIGS. 5A and 5B. In the case of the alignment film 7 formed using Reagent No. 4, liquid crystal molecules are initially aligned at a pretilt angle of 89.8°, the response to the application of an electric field is 14.3 ms (milliseconds), and the retention of a voltage applied during a frame period (16.7 ms) is 93.4%. In the case of the alignment film 7 formed using a precursor solution which contains Reagent Nos. 5 and 6 at a weight ratio of 50:50, the liquid crystal molecules are initially aligned at a pretilt angle of 89.9°, the response to the application of the electric field is 13.9 ms (milliseconds), and the retention of the voltage applied during the frame period (16.7 ms) is 93.0%.

Patent Document 11 discloses Reagent No. 7 suitable for the IPS type liquid crystal display device shown in FIGS. 6A and 6B. The alignment film 7 is formed using Reagent No. 7 and subjected to rubbing treatment to manufacture the liquid crystal display device. As a result, the occurrence of an afterimage on the display screen is suppressed.

Therefore, even in the liquid crystal display devices not only of the VA type and the IPS type but also of a twisted nematic (TN) type and an optically compensated birefringence (OCB) type, the effect of the alignment film in the case where the image quality is to be improved cannot be neglected. However, there is a problem that should be taken into account because it is essential to apply the precursor solution as described above to the base film in the forming process. For example, when the precursor solution is ejected from an ink jet nozzle and successively applied in a stripe shape to the surface of the base film to form the alignment film, uneven streaks occurs on the surface of the alignment film because of uneven evaporation of the solvent from the film formed by the application of the precursor solution. In order to eliminate the unevenness, Patent Document 12 describes that a surface tension of the precursor solution is reduced to a value equal to or smaller than 32 mN/m. However, the inventor(s) of the present invention found a problem in that the bead spacers 3, which landed at desired positions on the principal surface of a substrate, by ejection of the spacer dispersion liquid containing the bead spacers 3 from the ink jet nozzle, are shifted from the positions by the alignment film formed on the principal surface of the substrate before and after the landing. According to the study of the inventor(s) of the present invention, the problem occurs also in the case where the bead spacers 3 are printed on the principal surface of the substrate such as the CF substrate 1b together with the spacer dispersion liquid. The reason therefore is based on a combination of the spacer dispersion liquid used for the bead spacers 3 and a raw liquid of the alignment film 7 covering the bead spacers 3, rather than a method of disposing the bead spacers 3 to the principal surface of the substrate.

Figure 7A:
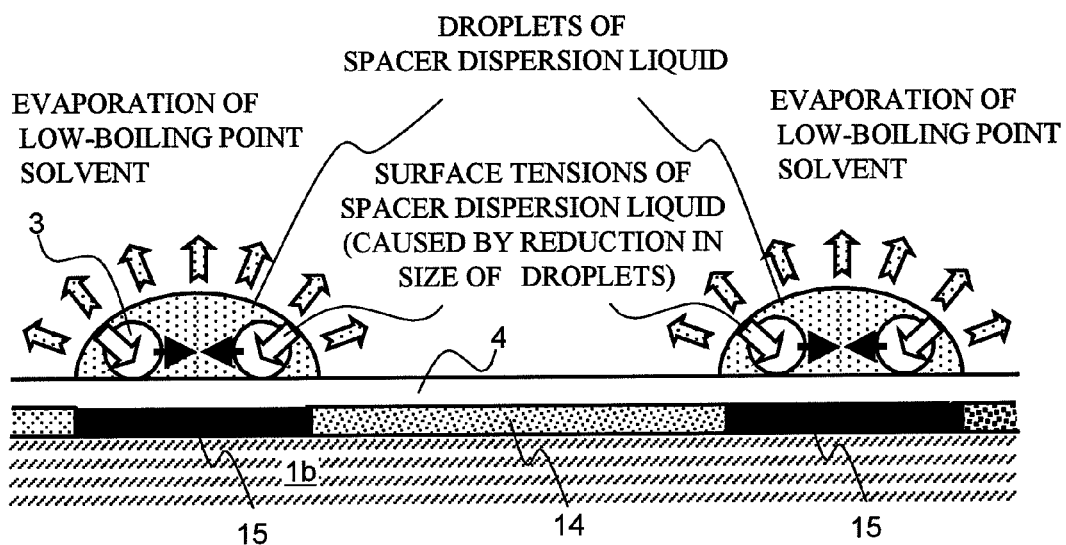
FIGS. 7A, 7B, 7C, and 7D each show the description of technical problems to be solved by the present invention and a cross sectional structure of the liquid crystal display device (CF substrate) which is well suited to solve the problems.
Figure 7B:
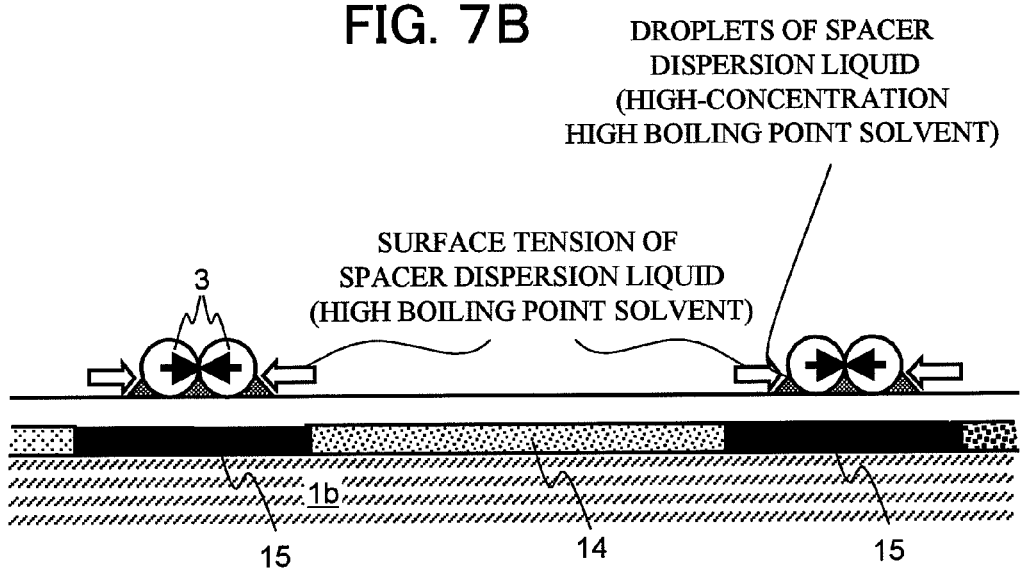
Figure 7C:
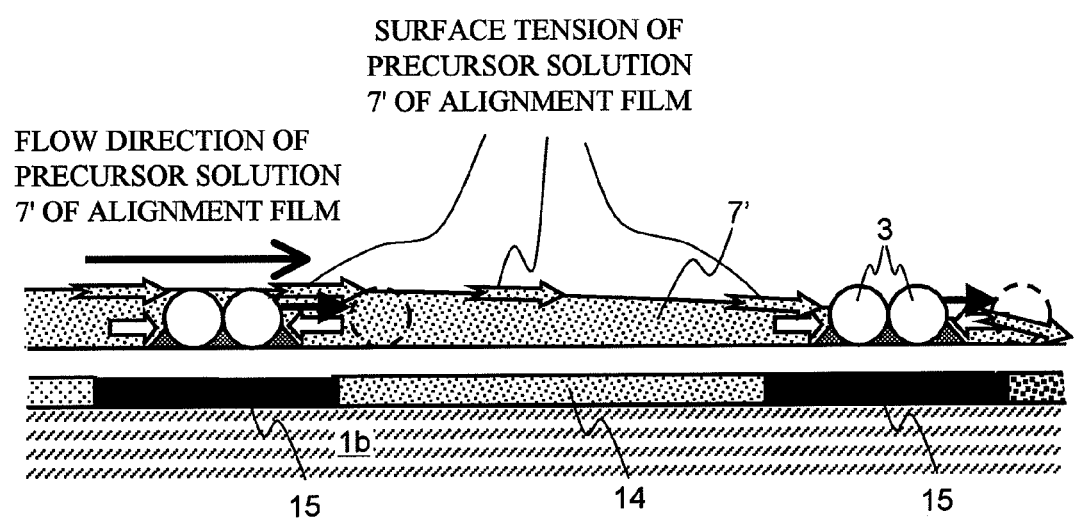

This problem will be described with reference to an example in which the bead spacers 3 are landed on the CF substrate 1b of FIG. 5A as shown in FIGS. 7A to 7D. According to the description of Patent Document 4, FIG. 7A shows the bead spacers 3 landed on the insulating film (planarizing film) 4 together with the spacer dispersion liquid prepared by the mixture of a high-boiling point solvent and a low-boiling point solvent. A droplet of the spacer dispersion liquid which is ejected from the ink jet nozzle is landed on a position to which the bead spacers 3 are disposed, that is, a portion of the insulating film 4 which overlaps with the light shielding film 15. After that, a concentration of the high-boiling point solvent contained in the droplet increases because of evaporation of the low-boiling point solvent. Therefore, the droplet is reduced in size while the curved surface thereof is gradually changed corresponding to the surface tension of the high-boiling point solvent. The bead spacers 3 are gradually shifted to the center of the droplet with the reduction in size thereof. As shown in FIG. 7B, the bead spacers 3 are attracted to each other at the center of the portion of the insulating film 4 which overlaps with the light shielding film 15. FIG. 7C schematically shows the flow of a precursor solution 7' of the alignment film which is applied by a spin coating method on the principal surface of the CF substrate 1b (upper surface of the insulating film 4) on which the bead spacers 3 are attracted to the light shielding region. Assuming that the surface tensions of the spacer dispersion liquid (in particular, high-boiling point solvent) reduced as shown in FIG. 7B are indicated by open arrows and the surface tensions of the precursor solution 7' are indicated by colored arrows, when the surface tensions of the precursor solution 7' are larger than the surface tensions of the spacer dispersion liquid, the bead spacers 3 are shifted by external forces corresponding to differences between the surface tensions of the precursor solution 7' and the surface tensions of the spacer dispersion liquid, so the bead spacers 3 are moved from the light shielding region to the pixel (light transmission region) as shown by a broken-line circle. When the spacer dispersion liquid is almost evaporated as shown in FIG. 7B, the bead spacers 3 are moved from a desired position by the precursor solution 7'. The flow of the precursor solution 7' of the alignment film is suppressed by applying the precursor solution 71 ejected from the ink jet head to the CF substrate 1b. However, even in such a case, the bead spacers 3 located on the insulating film 4 are shifted as shown in FIG. 7B. Also when the bead spacers 3 are landed on the principal surface of the TFT substrate 1a, the same problem occurs.

EXAMPLE 1

In order to prevent the shift of the bead spacers 3, according to the present invention, the surface tension of the high-boiling solvent contained in the spacer dispersion liquid is made higher than the surface tension of the precursor solution 7' of the alignment film, so the bead spacers 3 are held to the light shielding region of the principal surface of the CF substrate 1b or the TFT substrate 1a by a residue of the spacer dispersion liquid. The spacer dispersion liquid landed on the principal surface of the substrate (CF substrate 1b) is evaporated to some extent before the precursor solution 7' of the alignment film is applied to the principal surface thereof. A part of the spacer dispersion liquid is left on the principal surface of the substrate. The residue of the spacer dispersion liquid corresponds to the part of the spacer dispersion liquid left on the principal surface of the substrate immediately before the precursor solution 7' is applied to the principal surface thereof. In the case of the spacer dispersion liquid containing the low-boiling point solvent and the high-boiling point solvent, the residue of the spacer dispersion liquid contains a high-boiling point solvent which is higher in concentration than the spacer dispersion liquid itself. The precursor materials (tetracarboxylic dianhydride and diamine) of the alignment film as shown in Table 1 may be contained in the spacer dispersion liquid to increase the surface tension or the viscosity of the residue.

Figure 7D:
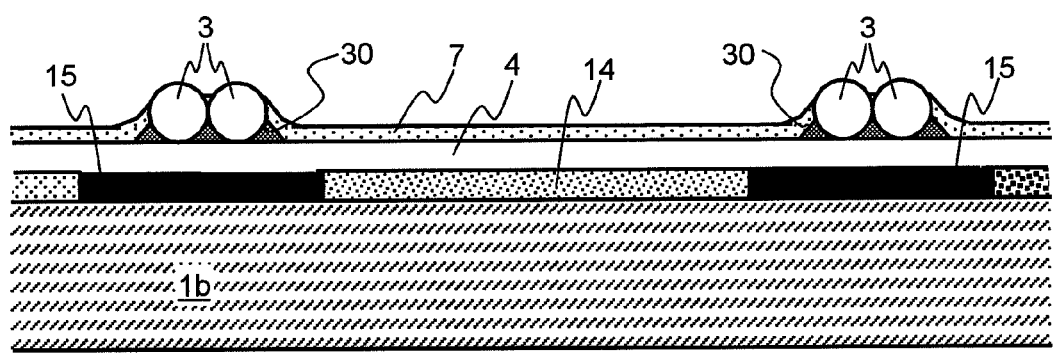

Compositions of Precursor Solution of Alignment Film and Spacer Dispersion Liquid The residue of the spacer dispersion liquid on the principal surface of the substrate holds, in the desired region (light shielding region described above) of the principal surface of the substrate, the bead spacers 3 whose surfaces are wet with its droplet, based on the surface tension or the viscosity of the droplet. That is, even when the bead spacers 3 are not held in specific positions of the principal surface of the substrate, the bead spacers 3 are not moved to the outside of the region because of the presence of the precursor solution 7' of the alignment film which is applied to the principal surface of the substrate. Naturally, the surface tension or the viscosity of the residue of the spacer dispersion liquid may be increased to prevent the shift of the bead spacers 3 within the region. The precursors of the alignment film may be added to the spacer dispersion liquid and polymerized with the residue thereof to hold the bead spacers 3 in the specific position of the principal surface of the substrate. Therefore, the liquid crystal display device according to the present invention, which is preferable for solving the technical problems with reference to FIG. 7C, includes, as shown in FIG. 7D, the substrate (CF substrate 1b) in which a first organic layer 30 (residue of spacer dispersion liquid) deposited to the bead spacers 3 and a second organic layer (alignment film 7) which covers the first organic layer 30 and is different in composition from the first organic layer 30 are formed on the principal surface of the substrate. The first organic layer 30 contains the spacer dispersion liquid (in particular, high-boiling point solvent) or an organic substance derived therefrom. The "organic substance derived from the spacer dispersion liquid" represents a substance produced by oxidation, reduction, modification, condensation, dimerization, decomposition, or the like of organic molecules contained as a solvent in the spacer dispersion liquid. The first organic layer 30 may not be necessarily made of only the organic substance, and may be formed as a part of the alignment film 7 which contains the organic substance described later.

For example, when the alignment film 7 of the VA type liquid crystal display device shown in FIGS. 5A and 5B is to be produced using the precursor solution 7' prepared by containing Reagent Nos. 5 and 6 at a weight ratio 50:50 (hereinafter, referred to as mixture liquid of Reagent Nos. 5 and 6), NMP (surface tension 41 mN/m, boiling point=204° C.) and BC (surface tension=27.4 mN/m, boiling point=171° C.) are prepared as solvents such that the surface tension of the precursor solution 7' becomes equal to or smaller than 32 mN/m. In order to suppress the occurrence of the uneven streaks on the surface of the alignment film 7, it is desirable to adjust the surface tension of the precursor solution 7' to a value equal to or smaller than 32 mN/m in the curing stage. Therefore, the surface tension of the precursor solution 7' is adjusted based on the selection of the high-boiling point solvent used therefore and a mixture ratio thereof. In contrast to this, for example, the spacer dispersion liquid contains NMP or GBL (surface tension=43.9 mN/m, boiling point=203° C.) as the high-boiling point solvent and is prepared so as to exhibit a larger surface tension than the surface tension of the precursor solution 7' in a stage in which the precursor solution 7' is applied onto the droplet thereof (see FIG. 7B). The spacer dispersion liquid further contains the low-boiling point solvent which is prepared with the high-boiling point solvent contained therein to adjust its surface tension or the viscosity in a range suitable for ejection from the ink jet head. The low-boiling point solvent contained in the spacer dispersion liquid is almost evaporated from the droplet of the spacer dispersion liquid before the precursor solution 7' of the alignment film is applied to the principal surface of the substrate on which the spacer dispersion liquid is dropped, so the "surface tension of the spacer dispersion liquid (droplet) to the precursor solution 7'" described above is not substantially reduced. The alignment film 7 (second organic layer) obtained by curing an applied film of the precursor solution 7' by drying and baking contains almost no high-boiling point solvent (NMP or BC). However, the first organic layer 30 covered with the alignment film 7 includes the high-boiling point solvent (at least one of NMP and GBL) or an organic material derived therefrom. Even when the alignment film 7 obtained by curing includes the high-boiling point solvent contained in the precursor solution 7' or a substance derived therefrom, the composition (ratio to content) of the high-boiling point solvent included in the alignment film 7 is different from the composition of the high-boiling point solvent included in the first organic layer 30. In some cases, the first organic layer 30 is formed as a polyimide film (resin film) made of tetracarboxylic dianhydride (TDA) and diamine (diamine A, diamine B, DDM), which are diffused from the applied film of the precursor solution 7' of the alignment film to the first organic layer 30. Such a resin film is also distinguished from the alignment film 7 (second organic layer) based on the point that the resin film contains the "high-boiling point solvent of the spacer dispersion liquid or the organic material derived therefrom" and the point of the composition of the high-boiling point solvent or the organic material.

In order to hold the bead spacers 3 to the principal surface (planarizing film 4) of the substrate (CF substrate 1*b*) against the flow of the precursor solution 7' of the alignment film, for example, at least one of Reagent No. 8 (surface tension=42 mN/m), Reagent No. 9 (surface tension=44 mN/m), Reagent No. 10 (surface tension 41 mN/m), Reagent No. 11 (surface tension=41 mN/m), and Reagent No. 12 (surface tension=41 mN/m), which are shown in Table 1, may be added as a precursor solution different from the precursor solution 7' to the spacer dispersion liquid. For example, when the spacer dispersion liquid obtained by preparing Reagent No. 10 and the low-boiling point solvent is dropped to the principal surface of the substrate (CF substrate 1*b*), along with the evaporation of the low-boiling point solvent, a mixture liquid of tetracarboxylic dianhydride (PMDA, DMCB) contained in Reagent No. 10 and diamine (BAPP) collects the bead spacers 3 instead of the high-boiling point solvent on the light shielding region of the principal surface of the substrate. When the mixture liquid is cured by polymerization of tetracarboxylic dianhydride and diamine, which are contained in the mixture liquid, and then the precursor solution 7' (mixture liquid of Reagent Nos. 5 and 6) of the alignment film is applied to the principal surface of the substrate, the first organic layer 30 is formed as a polyimide film whose composition is different from the composition of the alignment film 7 (second organic layer produced using Reagent Nos. 5 and 6). Even when the first organic layer 30 formed using Reagent No. 10 is partially dissolved by the solvent contained in the mixture liquid of Reagent Nos. 5 and 6 (precursor solution 7' of the alignment film) which is applied to the upper surface of the first organic layer 30, the first organic layer 30 continues to hold the bead spacers 3 in predetermined positions because of the surface tension or the viscosity of the polyimide precursors contained in the first organic layer 30. Note that each of Reagent Nos. 8, 11, and 12 is prepared by two kinds of "mixture liquids of tetracarboxylic dianhydride and diamine" and a mixture liquid of (tetracarboxylic dianhydride)* and (diamine)*, which is one of the mixture liquids, is added to the other of the mixture liquids while the mixture liquid is imidized to 90% or higher by addition of pyridine and acetic anhydride. Even when tetracarboxylic dianhydride and diamine are contained in the spacer dispersion liquid as in the case of the precursor solution 7 of the alignment film, the first organic layer 30 is different in composition from the alignment film 7 (second organic layer) because of a difference between the contained high-boiling point solvents.

The fixed structure of the bead spacers 3 on the principal surface of the substrate as shown in FIG. 7D can also be applied to the TFT substrate 1*a*. The fixed structure can be applied to any of the liquid crystal display devices of the IPS type, the TN type, and the OCB type in addition to the VA type. When any of Reagent Nos. 1, 2, and 3 shown in Table 1 is used as the precursor solution 7' of the alignment film, a substance whose surface tension is higher than a mixture of a high-boiling point solvent contained in the reagent may be selected as the solvent of the spacer dispersion liquid, or the mixture liquid may be adjusted. At least one of Reagent No. 13 (surface tension=30 mN/m), Reagent No. 14 (surface tension=31 mN/m), Reagent No. 15 (surface tension=31 mN/m), Reagent No. 16 (surface tension=30 mN/m), and Reagent No. 17 (surface tension=30 mN/m), each of which has a relatively low surface tension, may be selected as the precursor solution 7' of the alignment film, and at least one of Reagent Nos. 8 to 12 may be added to the solvent of the spacer dispersion liquid. The solvent contained in Reagent No. 14, that is, DEDG stands for diethylene glycol diethyl ether (boiling point is 217° C.). This example assumes that the alignment film 7 is made of polyimide. Even in the case of a liquid crystal display device in which the alignment film is made of an organic material except polyimide, when the precursor solution 7' of the alignment film 7 and the spacer dispersion liquid are prepared according to the above-mentioned scope, the structure characterized to the present invention is embodied.

Process for Manufacturing Liquid Crystal Display Device

Figure 8A:
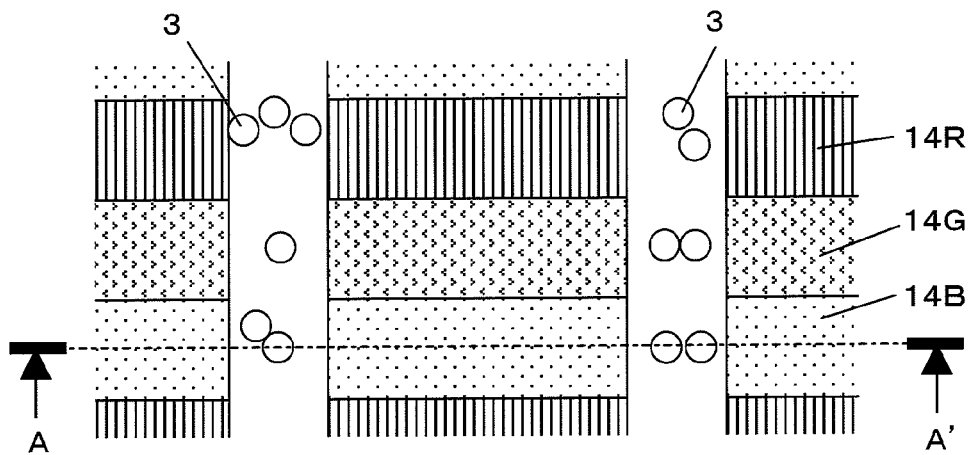
FIG. 8A is a plan view.
Figure 8B:
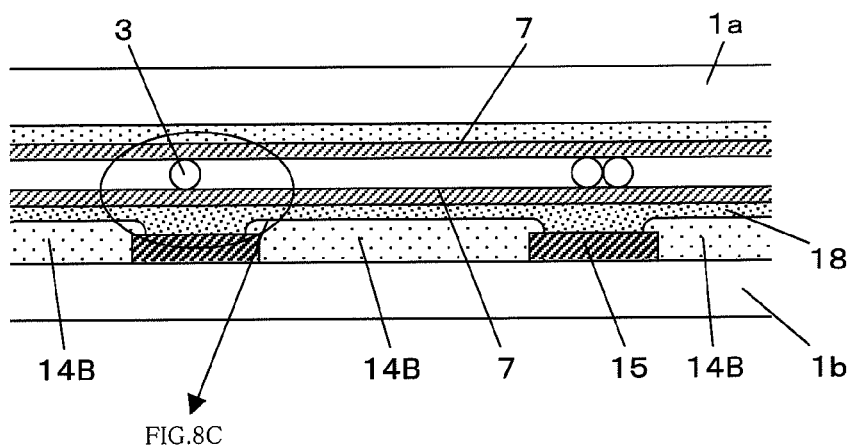
FIGS. 8B and 8C are cross sectional views showing a structure of a conventional liquid crystal display panel using bead spacers.
Figure 8C:
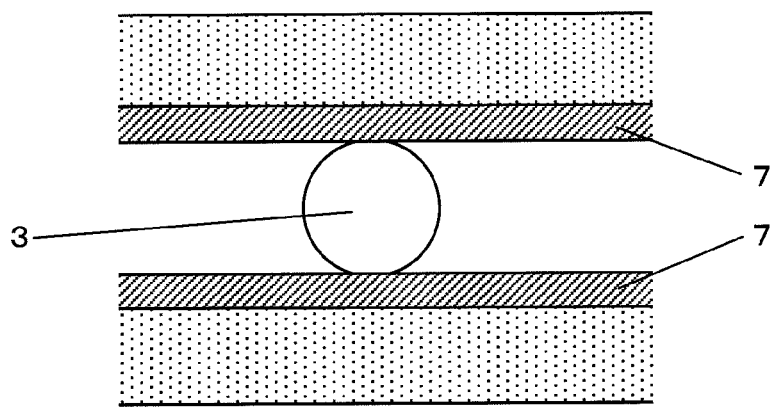
Figure 9A:
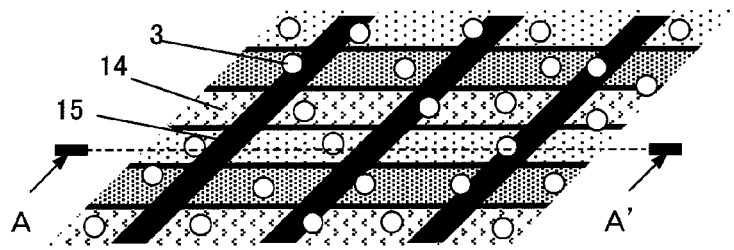
FIGS. 9A and 9B are a perspective view and a cross sectional view showing a conventional liquid crystal display panel (CF substrate) using bead spacers.
Figure 9B:
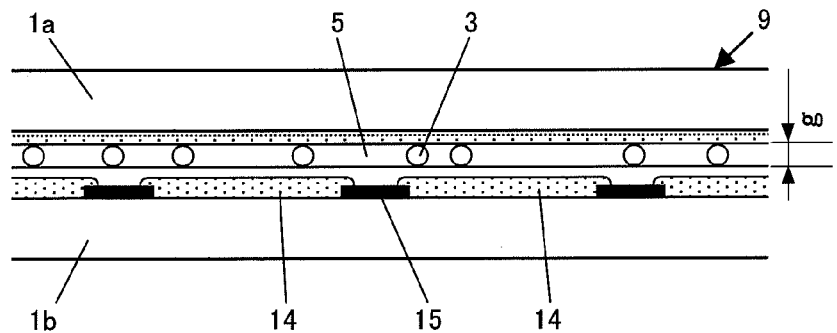
Figure 10A:
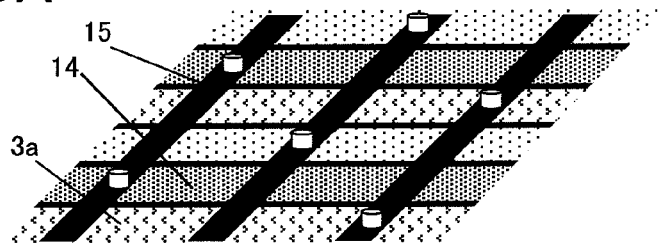
FIGS. 10A and 10B are a perspective view and a cross sectional views showing a conventional liquid crystal display panel (CF substrate) using columnar spacers.
Figure 10B:
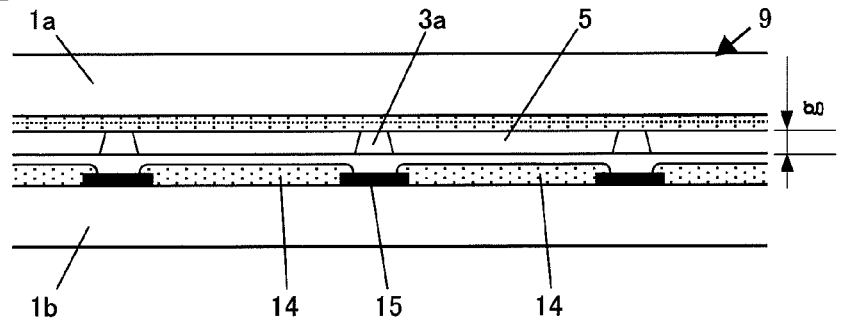

A typical process of a method of manufacturing the liquid crystal display device (liquid crystal display panel) according to this example will be described with reference to FIGS. 1A, 1B, and 1C. In general, when the liquid crystal display panel using the bead spacers 3 is to be manufactured, the alignment film 7 necessary to align the directions of liquid crystal molecules to one direction is formed by printing or application to the surface (principal surface) of at least one of a pair of substrates included in the liquid crystal display panel and then the bead spacers 3 are disposed on the alignment film 7. FIG. 8A shows an example of a planar structure of a substrate (CF substrate 1*b*) to which the bead spacers 3 are disposed by a conventional method. FIG. 8B shows an example of a cross sectional structure of the liquid crystal display panel assembled by bonding the substrate to another substrate (TFT substrate 1*a*). FIG. 8C is an enlarged view showing the bead spacer 3 and the periphery of the bead spacer 3 in the cross sectional structure.

However, the feature of this example is a process of disposing the bead spacers 3 in the fixed positions to the surface of the substrate 1 on which the alignment film 7 is not printed or applied and then printing or applying the alignment film 7. In general, after normal printing or application, the alignment film 7 is first dried by heating at a temperature of 60° C. to 70° C. and subsequently baked at a temperature equal to or higher than 200° C. In this example, the bead spacers 3 are disposed in portions which do not affect the display quality and are located between pixel regions (located above the BM 15 of the CF substrate 1b in FIG. 1B), of the substrate 1 on which the alignment film 7 is not printed or applied. Then, the raw liquid of the alignment film 7 is printed or applied so as to cover the bead spacers 3. Therefore, the raw liquid of the alignment film 7 enters gaps between the bead spacers 3 and the substrate 1b, thereby forming a fillet. After that, when the raw liquid is dried and baked, the raw liquid including the fillet is cured, so the bead spacers 3 are bonded to the principal surface of the substrate 1b (upper surface of the planarizing film 4) through the fillet deposited to the bead spacers 3 and an end portion of the alignment film 7. The bonding force of the bead spacers 3 to the substrate 1b in this example is dramatically improved as compared with the bonding force to the substrate 1b, of the bead spacers 3 disposed on the alignment film 7 which is printed or applied in advance to the surface of the substrate.

The raw liquid of the alignment film 7 is prepared such that the surface tension of the raw liquid becomes 35 mN/m. Reagent No. 1 shown in Table 1 is used and a ratio of NMP with respect to DMA, which are contained therein, is reduced to a value equal to or smaller than 0.1. A dispersion liquid which contains NMP and GBL at a weight ratio of 1:1 and is dispersed with the bead spacers 3 is dropped onto the light shielding region 15 of the principal surface of the substrate 1b which is not covered with the raw liquid of the alignment film 7. When the principal surface of the substrate 1b to which the bead spacers 3 are disposed is covered with the raw liquid of the alignment film 7, the dispersion liquid opposes the flow of the raw liquid at a higher surface tension than the raw liquid and holds the bead spacers 3 in the dropped positions. During this process, PMDA and DDE which are polyamide precursors contained in the raw liquid are diffused into the dispersion liquid by osmotic pressure. After that, when the substrate 1b is baked at 250° C. which is higher than a boiling point of NMP or GBL to complete the alignment film 7, the fillet is cured as a polyimide resin together with the alignment film 7. However, the polyimide resin included in each of the alignment film 7 and the fillet contains, as impurities, NMP and DMA or an organic substance derived from GBL. From FIG. 1B macroscopically showing a cross section obtained by cutting the substrate 1b along an A-A' line of FIG. 1A, it appears that the fillet is formed only in the alignment film 7. However, from FIG. 1C which is an enlarged view showing the cross section, the organic substance film (first organic layer) 30 obtained from the dispersion liquid is recognized. When a composition of the organic substance film 30 located under the bead spacers 3 and a composition of the alignment film 7 are analyzed by secondary ion mass spectrometry, a difference between the composition of the organic substance film 30 and the composition of the alignment film 7 is recognized based on fragment ions detected therefrom.

Figure 2:
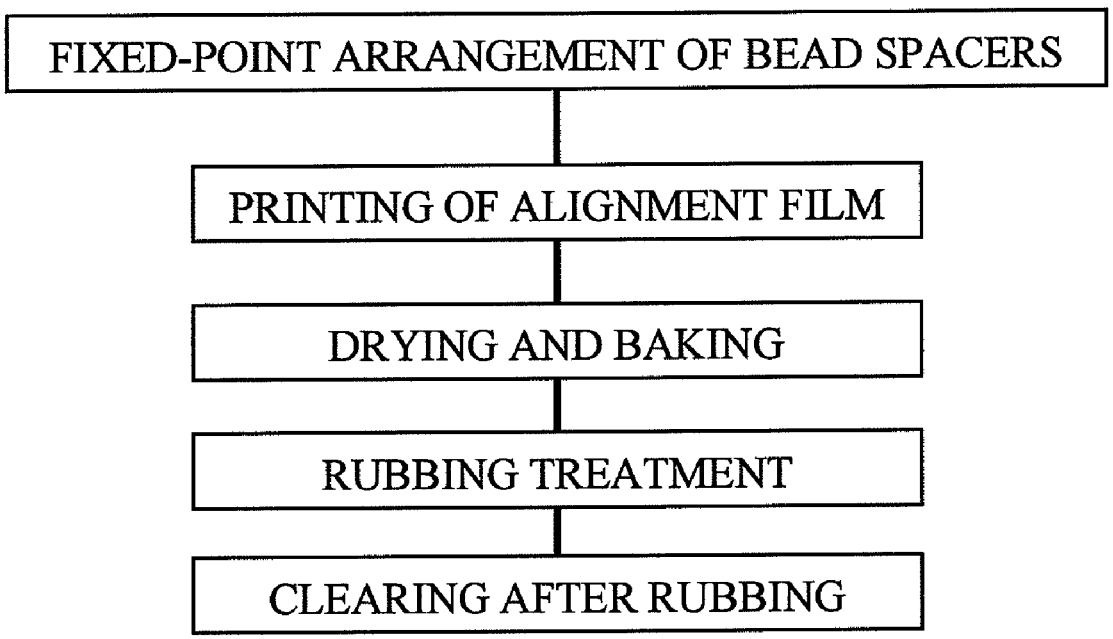
FIG. 2 is a flow chart showing a process of manufacturing the liquid crystal display device (CF substrate) according to Example 1 of the present invention.
Figure 11:
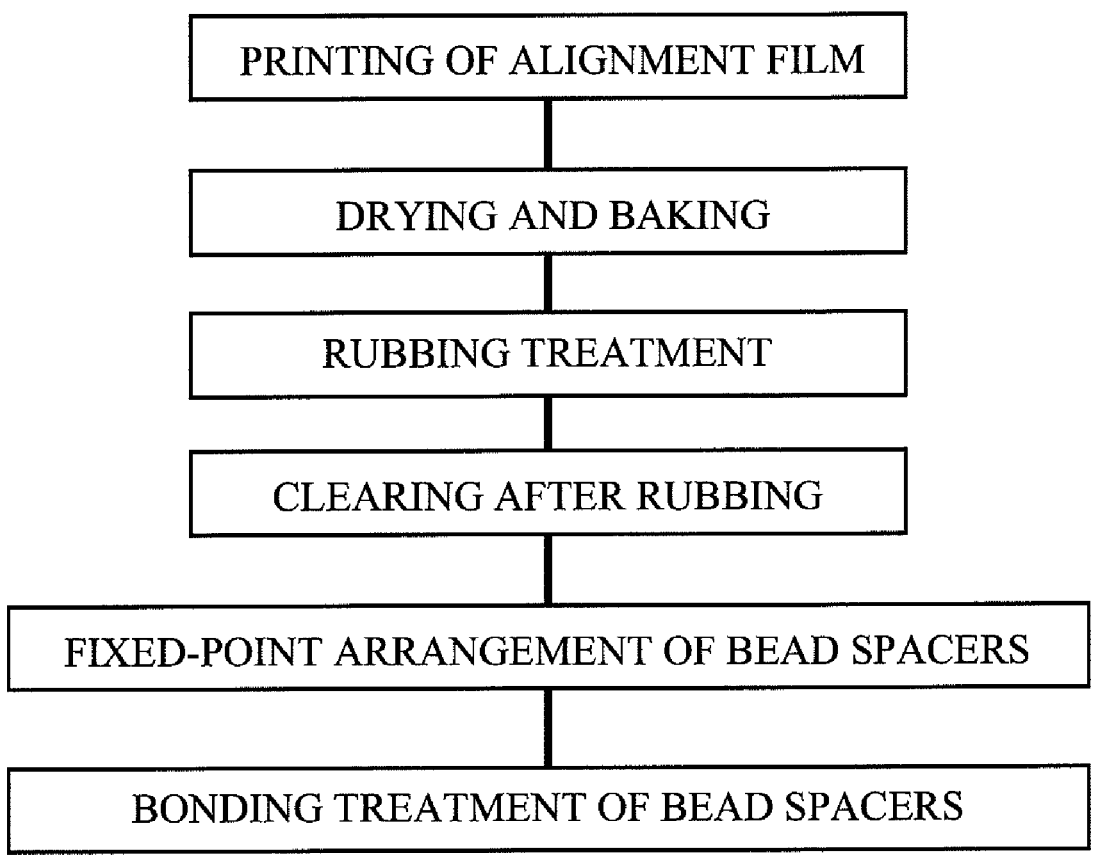
FIG. 11 is a flow chart showing a process of manufacturing the conventional liquid crystal display device (CF substrate) using the bead spacers as spacers.

FIG. 2 shows the flow of treatment of the CF substrate 1b in the method of manufacturing the liquid crystal display device (liquid crystal display panel) according to this example. In order to compare with the example, FIG. 11 shows the flow of treatment of the CF substrate 1b in the conventional liquid crystal display device in which an interval between the TFT substrate 1a and the CF substrate 1b is maintained constant by the bead spacers 3 as described with reference to FIG. 11. The description with respect to steps performed before the "fixed-point arrangement of the bead spacers 3 to the principal surface of the substrate" in this example, steps performed before the "printing of the alignment film to the principal surface of the substrate" in the case of the conventional liquid crystal display device, and a "liquid crystal display device assembly and liquid crystal injection step" for bonding the CF substrate 1b to the TFT substrate 1a and injecting a liquid crystal material between the CF substrate 1b and the TFT substrate 1a is omitted because the steps in this example are also performed as in the case of the conventional liquid crystal display device.

In the conventional process, the alignment film (raw liquid thereof) is first printed or applied onto the substrate while the film thickness thereof is adjusted to a predetermined film thickness. Next, the applied alignment film is dried and baked. Then, the cured alignment film is subjected to rubbing treatment necessary to align the directions of the liquid crystal molecules to a predetermined direction (rubbing treatment is not essential for the VA type liquid crystal display device). After that, the principal surface of the substrate is cleaned if necessary. Subsequently, the bead spacers are disposed on the principal surface. After the arrangement of the bead spacers, bonding treatment for fixedly bonding the bead spacers to the alignment film may be performed. According to normal bonding treatment, a bonding material with which the surfaces of the bead spacers are coated is heated or the dispersion liquid landed on the principal surface of the substrate together with the bead spacers is dried, thereby generating the bonding force between the substrate and the bead spacers.

Figure 1B:
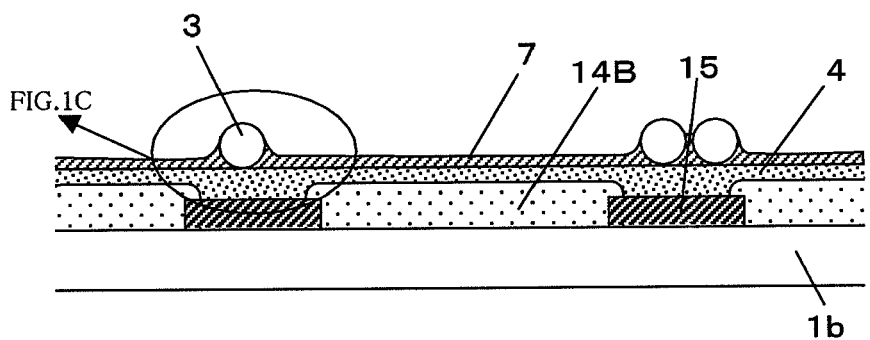
FIGS. 1B and 1C are cross sectional views each showing the structure of a liquid crystal display device (CF substrate) according to Example 1 of the present invention.
Figure 1C:
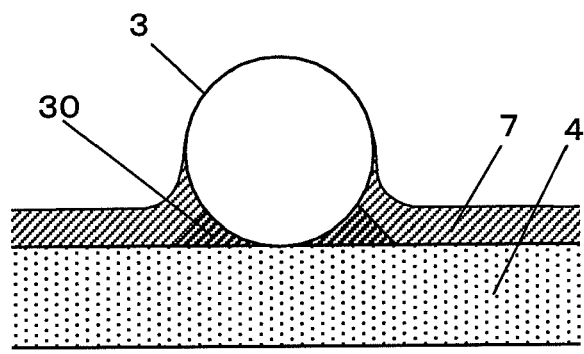

In contrast to this, the substrate 1b included in the liquid crystal display device according to this example, which is described with reference to FIGS. 1A to 1C, is processed in order of the steps shown in FIG. 2.

According to the process of this example, the bead spacers are first disposed at predetermined locations (light shielding regions or non-display regions) of the principal surface of the substrate. Then, bonding treatment for fixedly bonding the bead spacers to predetermined positions of the principal surface of the substrate is performed if necessary. After that, the alignment film (raw liquid thereof) is printed on or applied to the substrate to which the bead spacers are disposed while the film thickness thereof is adjusted to a predetermined film thickness. When the bead spacers are to be disposed on the principal surface of the substrate by an ink jet method, the bonding treatment proceeds under the evaporation of the low-boiling point solvent contained in the dispersion liquid (which is also called ink) including the bead spacers and the action of the high surface tension of the high-boiling point solvent. When the dispersion liquid is to be printed to a screen printing plate or the like, the bonding treatment proceeds in the same manner.

The raw liquid of the alignment film which is printed or applied to the principal surface of the substrate which includes the bead spacers is dried and baked by heating the substrate 1b and thus cured as the alignment film. The upper surface of the alignment film is subjected to rubbing treatment necessary to align the directions of liquid crystal molecules to a predetermined direction. After that, the substrate 1b is cleaned if necessary and transferred to a liquid crystal display device assembly line including a process line for bonding the substrate 1b to the substrate 1a.

EXAMPLE 2

The following method will be described as another example to solve the technical problems with reference to FIGS. 7A to 7D. In this method, as shown in FIG. 6a, the alignment film 7 is disposed on the principal surface of the substrate (CF substrate 1b) and then the bead spacers 3 are disposed on the alignment film 7 (portions covering the light shielding film 15) by an ink jet method.

According to such a method, the bead spacers 3 are not moved by the precursor solution 7' of the alignment film. However, the "shift of the bead spacers 3" which are dropped on the alignment film 7 (principal surface of the CF substrate 1b) or the "shift of the bead spacers 3" which is caused by the flow of a liquid crystal material injected to a space (cell gap) between the pair of substrates 1 bonded opposite to each other emerges as a new problem. The bead spacers 3 are in contact with the liquid crystal material, so the fixation of the bead spacers 3 to the alignment film 7 using an adhesive causes contamination of the liquid crystal layer 5 by the adhesive or deterioration of optical characteristics of the liquid crystal molecules 5a.

In this example, the organic substance used for the alignment film is selected as a material which does not damage the liquid crystal layer 5 and holds the bead spacers 3 to an inner portion of the liquid crystal layer 5 in predetermined regions (light shielding regions) of the principal surface of the substrate. However, the mixture liquid of the precursors (tetracarboxylic dianhydride and diamine) of the alignment material represented by polyimide is normally viscous, so it is considerably difficult to eject the mixture liquid from the ink jet nozzle. Even when the mixture liquid is diluted with a solvent or the spacer dispersion liquid is adjusted using a specific precursor, the bead spacers 3 are moved from the landing positions on the alignment film 7 to the outside of the predetermined regions because the spacer dispersion liquid is spread on the upper surface of the alignment film 7 or the alignment film 7 is partially dissolved by the spacer dispersion liquid.

In order to solve the new technical problem described above, according to the present invention, precursors of the "organic substance used for the alignment film" are contained in the spacer dispersion liquid to reduce failures at the time of ejection from the ink jet nozzle. Therefore, the bead spacers 3 are bonded to the landing positions or positions close thereto on the alignment film 7 by the polymerization of the precursors after the landing to the alignment film 7.

Compositions of Precursor Solution of Alignment Film and Spacer Dispersion Liquid For example, when the alignment film 7 of the IPS type liquid crystal display device shown in FIGS. 6A and 6B is formed using Reagent No. 7 as the precursor solution 7', the bead spacers 3 are dispersed to the spacer dispersion liquid prepared using at least one of Reagent Nos. 8 to 12 and landed from the ink jet nozzle to the predetermined regions of the alignment film 7. Any of Reagent Nos. 8 to 12 exhibits a low viscosity (10 mPa·s) sufficient to be ejected from the ink jet nozzle as the mixture liquid of tetracarboxylic dianhydride and diamine, and does not contain a solvent dissolving the surface of the alignment film 7 which is formed using Reagent No. 7 and baked. According to the compositions of the solvents NMP, BC, and GBL which are contained in Reagent No. 7, in the case where the surface tension of the Reagent No. 7 is adjusted to a value equal to or smaller than 40 mN/m, even when the solvent residues are contained in the alignment film 7, each of Reagent Nos. 8 to 12 which exhibits a surface tension larger than 40 mN/m sufficiently suppresses the shift of the bead spacers 3 to the outside of the predetermined regions. In the case of the spacer dispersion liquid prepared using Reagent No. 7, the bead spacers 3 may be landed on the alignment film 7 formed using Reagent No. 7. In this case, a "sum of NMP content and GBL content with respect to BC content" in the spacer dispersion liquid (high-boiling point solvent) is made larger than the sum for Reagent No. 7 used for the precursor solution 7' of the alignment film to increase the surface tension of the spacer dispersion liquid to a value higher than the surface tension of the precursor solution 7' of the alignment film. Therefore, the bead spacers 3 is suppressed from being shifted on the surface of the alignment film 7 partially dissolved by the spacer dispersion liquid.

In any of the examples described above, as shown in FIG. 6A, the bead spacers 3 are bonded to the upper surface of the alignment film 7 (surface facing the liquid crystal layer 5) by an organic film (resin film) 31 which is formed on the alignment film (resin film) 7 and different in composition from the alignment film 7. That is, the organic film 31 is formed by the polymerization of the same precursors as those of the alignment film 7, but the spacer dispersion liquid is dropped on the alignment film 7 together with a solvent suitable to hold the bead spacers in desirable positions on the alignment film 7. Therefore, the solvent or an organic substance derived therefrom is taken into the organic film 31 during drying or baking thereof.

The resin material for forming the organic film 31, separated from the bead spacers 3, may be supplied onto the alignment film 7. For example, a solution containing (precursors of) the resin material may be applied or printed onto the bead spacers 3 after the bead spacers 3 are landed on the alignment film 7. When the bead spacers 3 are to be covered with the resin material contained as a main ingredient of the organic film 31 or the precursors thereof (hereinafter, referred to as raw material of the organic film 31), it is desirable to increase the surface tension of a solution containing the resin material or the precursors thereof (hereinafter, referred to as raw liquid of the organic film 31) or the surface tension of a dispersion liquid for landing the bead spacers 3 (which does not contain the resin material and the precursors thereof) to a value equal to the surface tension of the spacer dispersion liquid. For example, when Reagent Nos. 7 to 12 each exhibiting a surface tension larger than 40 mN/m are used for the raw liquid of the organic film 31, the dispersion liquid which does not contain the raw material of the organic film 31 is prepared using the organic solvent such as NMP or GBL, which exhibits a relatively high surface tension.

The fixed structure of the bead spacers 3 on the principal surface of the substrate as shown in FIG. 6A can be applied to the TFT substrate 1a. The fixed structure can be applied to any of the liquid crystal display devices of the VA type, the TN type, and the OCB type in addition to the IPS type. It is desirable to prepare the precursor solution 7' of the alignment film and the spacer dispersion liquid such that the surface tension of the spacer dispersion liquid becomes higher than the surface tension of the precursor solution 7'. It is also desirable to provide the spacer dispersion liquid as a mixture liquid of the precursors of the organic film 31. When the bead spacers 3 disposed in advance on the alignment film 7 are to be covered with the resin material included in the organic film 31, it is desirable to prepare the raw liquid of the organic film 31 as in the case of the spacer dispersion liquid. The surface tension of the dispersion liquid which does not contain the raw material of the organic film 31 is desirably adjusted using, for example, the organic solvent described in Example 1. The composition of each of the precursor solution 7' of the alignment film, the spacer dispersion liquid, and the solution containing the resin material for the organic film 31 or the precursors thereof is not limited to the above-mentioned example. For example, at least one of Reagent Nos. 13 to 17 (each exhibiting a surface tension equal to or smaller than 30 mN/m) shown in Table 1 may be used for the precursor solution 7' of the alignment film, and at least one of Reagent Nos. 8 to 12 (each exhibiting a surface tension larger than 40 mN/m) shown in Table 1 may be used for the spacer dispersion liquid or the raw liquid of the organic film 31. Any of Reagent Nos. 1 to 4 may be used for the precursor solution 7' of the alignment film and the spacer dispersion liquid to increase a "solvent content ratio of NMP to DMA or BC" in the spacer dispersion liquid or the solvent of the raw liquid of the organic film 31 to a value higher than a solvent content ratio of the precursor solution 7' of the alignment film. This example also assumes that the alignment film 7 is made of polyimide. Even in the case of a liquid crystal display device in which the alignment film is made of an organic material except polyimide, when the precursor solution 7' of the alignment film and, the spacer dispersion liquid or a combination of the raw liquid of the organic film 31 and the dispersion solution which does not contain the raw material of the organic film 31 are prepared according to the above-mentioned scope, the structure characterized to the present invention is embodied.

Process for Manufacturing Liquid Crystal Display Device

A typical process of a method of manufacturing the liquid crystal display device (liquid crystal display panel) according to this example will be described with reference to FIGS. 3A, 3B, and 3C. In Example 1 of the present invention, the bead spacers are disposed in the fixed points to the substrate on which the alignment film is not printed or applied, and then the alignment film is printed or applied. In contrast to this, in this example, as in the case of the conventional liquid crystal display device, the raw liquid of the alignment film is printed or applied to the principal surface of the substrate. The applied film is dried and baked to form the alignment film. The formed alignment film is further subjected to rubbing treatment and cleaning. After that, the bead spacers 3 are disposed in the fixed points to the upper surface of the alignment film. The bead spacers 3 are disposed in the regions which do not affect the display quality of the liquid crystal display device, that is, the portions of the alignment film which cover the light shielding regions 15 (non-display regions) separating the pixel regions. In each of FIGS. 1A and 3A, the plurality of light shielding regions 15 extend opposite to the plurality of scanning signal lines 6 formed above the principal surface of the TFT substrate 1a shown in FIG. 5B or 6B but are not opposed to the video signal lines 8. The light shielding regions 15 may be extended opposite to the video signal lines 8 or opposed to the scanning signal lines 6 and the video signal lines 8 in a grid shape. FIG. 6B shows the light shielding regions 15 formed on the principal surface of the CF substrate 1b in a grid shape (to have an opening for each pixel) and the bead spacers 3 disposed in several portions of the alignment film 7 located above the light shielding film 15.

An organic material liquid is printed or applied to each region of the alignment film 7 to which the bead spacers 3 are disposed in the fixed points, and then cured to form the organic material film 31. A solution containing, for example, the precursor solution of the alignment film as shown in Table 1 is preferably used as the organic material liquid. The liquid crystal layer 5 is not contaminated by the organic material film 31. The organic material liquid may contain the precursors used to form the alignment film 7. It is desirable to prepare the organic material liquid such that the surface tension thereof becomes larger than the surface tension of the precursor solution (raw liquid) used to form the alignment film 7. Alternatively, it is desirable to prepare the organic material liquid such that the viscosity thereof becomes higher than the viscosity of the raw liquid of the alignment film 7. An applied film (corresponding to a fillet) of the organic material solution which is deposited to the upper surfaces of the bead spacers 3 and the upper surface of the alignment film 7 in each region is cured by drying and baking to become the organic material film 31, thereby fixedly bonding the bead spacers 3 to the upper surface of the alignment film 7. As described above, the bead spacers 3 are disposed on the substrate, the organic material liquid (for example, raw liquid of the alignment film) is printed or applied, and the film of the organic material liquid is dried and baked. Therefore, as in the case of the raw liquid of the alignment film described in Example 1 of the present invention, the organic material liquid enters a gap between the bead spacers 3 and the substrate 1b to form the fillet. Depending on the viscosity of the organic material liquid, the applied film of the organic material liquid which corresponds to the fillet is changed by curing into the organic material film 31 similar in shape to the fillet. The bonding force of the bead spacers 3 to the alignment film 7 (substrate 1b) which is caused by the organic material film (alignment material film) 31 is dramatically improved as compared with the bonding force to the alignment film 7 (substrate 1b), of the bead spacers 3 disposed on the alignment film 7 which is printed or applied in advance to the surface of the substrate.

The organic material film 31 formed in the fillet shape is confined to each region of the alignment film 7 (non-display region between pixels), so light passing through a pixel (color filter 14) is not scattered. Therefore, assuming that, before the fixed-point arrangement of the bead spacers 3, rubbing treatment necessary to specify the directions of the liquid crystal molecules to the predetermined direction is performed on the upper surface of the alignment film 7 which has dried and baked, and then substrate cleaning treatment following the rubbing treatment is performed. Even in such a case, an alignment regulation force of a region of the alignment film 7 which is opposed to the pixel (color filter 14) does not deteriorate and the display quality of the liquid crystal display device is not affected. As a result, it is unnecessary to perform rubbing treatment again on the alignment film 7 to which the bead spacers 3 are bonded by baking the organic material film 31.

Figure 3A:
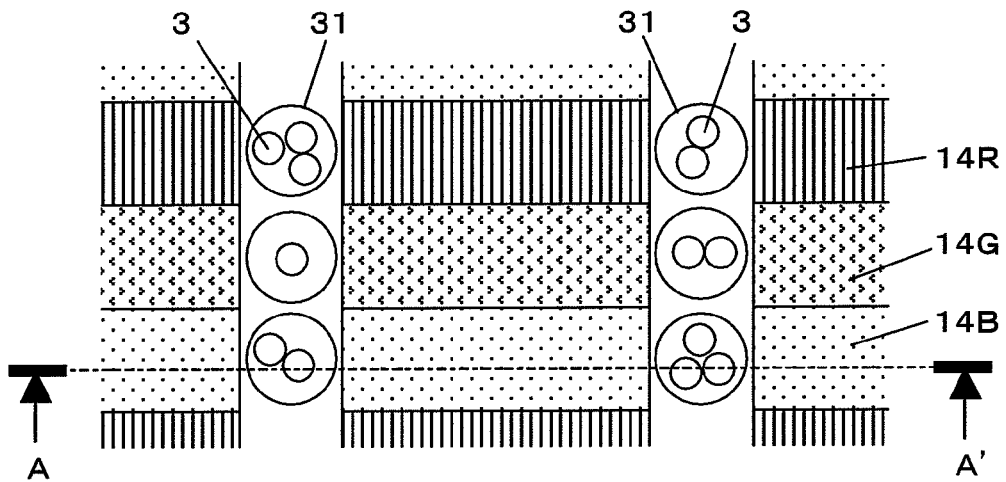
FIG. 3A is a plan view.
Figure 3B:
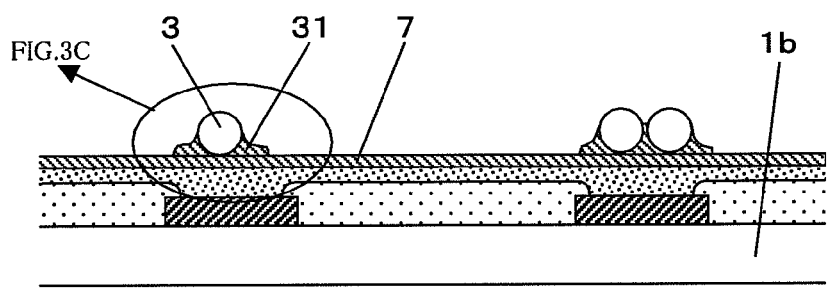
FIGS. 3B and 3C are cross sectional views each showing a structure of a liquid crystal display device (CF substrate) according to Example 2 of the present invention.
Figure 3C:
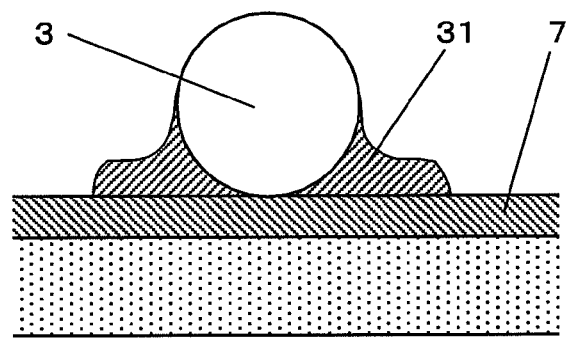

The CF substrate 1b included in the liquid crystal display device according to this example, which is described with reference to FIGS. 3A to 3C, is processed in order of the steps shown in FIG. 4.

In manufacturing the liquid crystal display device according to this example, the step of printing the alignment film 7 to the principal surface of the CF substrate 1b to the step of cleaning the CF substrate 1b after the rubbing of the alignment film are performed as in the case of the conventional process described with reference to FIG. 11. After the cleaning of the CF substrate 1b, the bead spacers 3 are disposed in the regions (non-display regions) of the alignment film 7, which do not affect the display quality and are located between pixel regions. After that, the organic material liquid (for example, raw liquid of the alignment film) is printed or applied to the regions to which the bead spacers are disposed. At this time, it is necessary to print or apply the organic material liquid onto the bead spacers for each of the regions. FIG. 3A shows that the organic material liquid is printed or applied in a dot shape for each of the regions of the alignment film 7 to which the bead spacers are disposed. As long as the organic material liquid stays within the non-display region (does not extend to pixel), for example, the organic material liquid may be printed or applied in a line shape along an extension direction of the light shielding film 15. That is, the applied film of the organic material liquid becomes the organic material film 31 after curing, so it is necessary to prevent the organic material liquid from extending from a region between pixel regions to form the organic material film 31 in a pixel (effective display pixel) whose light transmittance is controlled by the liquid crystal layer 5. After that, the applied film of the organic material liquid is dried and baked. Then, the CF substrate 1b is transferred to a liquid crystal display device assembly line including a process line for bonding the CF substrate 1b to the TFT substrate 1a.

In the manufacturing process, the raw liquid of the alignment film 7 is prepared such that the surface tension of the raw liquid becomes 35 mN/m. Reagent No. 1 shown in Table 1 is used and a ratio of NMP to DMA which are contained therein is reduced to a value equal to or smaller than 0.1. The bead spacers 3 are dispersed to a dispersion liquid prepared to contain NMP and DMA at a weight ratio of 9:1. The dispersion liquid is printed on the regions (non-display regions) of the alignment film 7 or landed thereon by the ink jet nozzle. When the bead spacers 3 are to be disposed on the alignment film 7 by an ink jet method, a solvent whose boiling point is lower than the boiling point of each of NMP and DMA (low-boiling point solvent described above) is further added to the dispersion liquid to adjust the surface tension of the solvent in a range in which ejection from the inkjet nozzle is easily performed. Although the organic material liquid is prepared using Reagent No. 1 shown in Table 1 as in the case of the raw liquid of the alignment film 7, the weight ratio of NMP and DMA which are contained in the organic material liquid is set to 9:1 as in the case of the dispersion liquid to make the surface tension of the organic material liquid larger than the surface tension of the raw liquid of the alignment film 7.

When the dispersion liquid and the organic material liquid are dropped to the surface of the alignment film 7 cured by drying and baking, the possibility that the surface of the alignment film 7 is partially dissolved cannot be denied because each of the dispersion liquid and the organic material liquid contain the solvent dissolving tetracarboxylic dianhydride (PMDA) and diamine (DDE) which are included in the polyimide resin of the alignment film 7. However, the bead spacers 3 are coagulated on the non-display regions by the high surface tension of the dispersion liquid. While the coagulation of the bead spacers 3 is maintained by the high surface tension of the organic material liquid, PMDA and DDE which are the precursors of the polyimide resin are deposited to the surfaces of the bead spacers 3. When the surface tension of the organic material liquid is large, the organic material liquid concentrates to specific positions on the non-display regions to crawl up along the surfaces of the bead spacers 3. Therefore, the lower end of the fillet corresponding to a part of the applied film of the organic material liquid does not extend to the outside of the non-display region. When the raw liquid of the alignment film 7 has a large surface tension as described above, unevenness caused corresponding to a delicate application condition difference or a dedicate printing condition difference markedly appears on the upper surface of the alignment film 7.

The applied film of the organic material liquid is dried and baked with a state in which the fillet crawling from the upper surface of the alignment film 7 to the surfaces of the bead spacers 3 is formed, thereby becoming the organic (material) film 31. The polyimide resin included in each of the alignment film 7 and the organic (material) film 31 contains the residues of organic substances derived from NMP and DMA as impurities. FIG. 3B shows a cross section obtained by cutting the substrate 1b of FIG. 3A along an A-A' line. FIG. 3C is an enlarged view showing the bead spacer 3 and the periphery thereof in the cross section. When a composition of the organic (material) film 31 and a composition of the alignment film 7 are analyzed by secondary ion mass spectrometry, a difference between the composition of the organic (material) film 31 and the composition of the alignment film 7, corresponding to a difference between a content ratio of NMP and DMA in the organic material liquid and the dispersion liquid and a content ratio of NMP and DMA in the raw liquid of the alignment film 7 is recognized based on fragment ions detected from the organic (material) film 31 and the alignment film 7.

The liquid crystal display device and the manufacturing method therefore which are provided according to the present invention are widely used for, for example, a television receiver, an information communication terminal, and a mobile telephone, each of which includes the liquid crystal display device, and a mass production yield thereof is improved.

Second Embodiment

A liquid crystal display device according to a second embodiment will be described.

There is a conventional liquid crystal display device in which a thin film transistor (TFT) substrate and a color filter substrate are bonded to each other to sandwich a liquid crystal layer therebetween. In the liquid crystal display device, in order to suitably hold a distance between the two substrates, spacers are disposed between the two substrates. For example, columnar resist layers are formed as the spacers to one of the substrates by photolithography (see Japanese Patent Laid-open Publication No. 2005-128357 (hereinafter, referred to as Patent Document 13)).

According to the invention disclosed in Patent Document 13, when the spacers are to be formed on the color filter substrate (CF substrate), it is necessary to apply a resin material onto the principal surface of the CF substrate and remove, from the resin material, parts other than parts to be formed for the spacers by photolithography. Therefore, it is necessary to further prepare a photo mask used for the photolithography, so a liquid crystal panel manufacturing cost is increased by a cost of the photo mask.

When the spacers disclosed in Patent Document 13 are formed not on the color filter substrate but the other substrate (TFT substrate) to which thin film transistors are provided, the spacers can be certainly disposed in regions located on a semiconductor layer of the TFT substrate and other regions within the principal surface of the TFT substrate. However, unevenness caused by thin film transistors and wiring layers, which are formed on the principal surface of the TFT substrate, occurs on an uppermost surface of the TFT substrate. Therefore, it is difficult to shape the resin material applied to the uppermost surface into the spacers by photolithography. That is, the unevenness on the uppermost surface of the TFT substrate also occurs on the surface of the resin material (film), so an intensity and a spot shape of light projected to the surface of the resin material through the photo mask are nonuniform. Thus, desired spacers cannot be formed.

The spacers can be formed on the color filter substrate whose uppermost surface is flatter than the uppermost surface of the TFT substrate without being bothered with such a problem. However, in order to dispose the spacers located on the color filter substrate to intended positions within the principal surface of the TFT substrate, it is necessary to perform accurate alignment between both the substrates. In a liquid crystal panel assembly process using a liquid crystal drop method (one-drop-fill process), the behavior of liquid crystal dropped on the principal surface of one of the bonded substrates also becomes a factor losing the accurate alignment between the substrates. Therefore, when not only the precision of alignment between the TFT substrate and the color filter substrate using alignment marks or the like but also the viscosity of liquid crystal dropped on one of the substrates, an ambient temperature, and an ambient pressure are not optimally adjusted, the spacers are not arranged within the principal surface of the TFT substrate as disclosed in Patent Document 13, with the result that a manufacturing margin for obtaining a non-defective liquid crystal panel reduces. Even in the case of a process which does not employ the liquid crystal drop method, that is, even in the case of a liquid crystal panel in which liquid crystal is injected between the pair of substrates which are bonded to each other, the accurate alignment between the substrates may be lost by an external force applied to the surface of one of the substrates during a cleaning process performed after the completion of the liquid crystal panel or during the transfer of the liquid crystal panel.

An object of the present invention is to form the spacers for the liquid crystal display device in view of a reduction in manufacturing cost and improvement of manufacturing margin for a non-defective product.

In order to solve the problem, in this embodiment, bead spacers which are raised in level (located on a raised portion) and bead spacers which are not raised in level are provided between substrates.

Hereinafter, this embodiment will be specifically described.

A liquid crystal display device has a structure in which a liquid crystal layer is sandwiched between a TFT substrate to which thin film transistors (TFTs) are formed and a color filter substrate to which color filters are formed.

Figure 12:
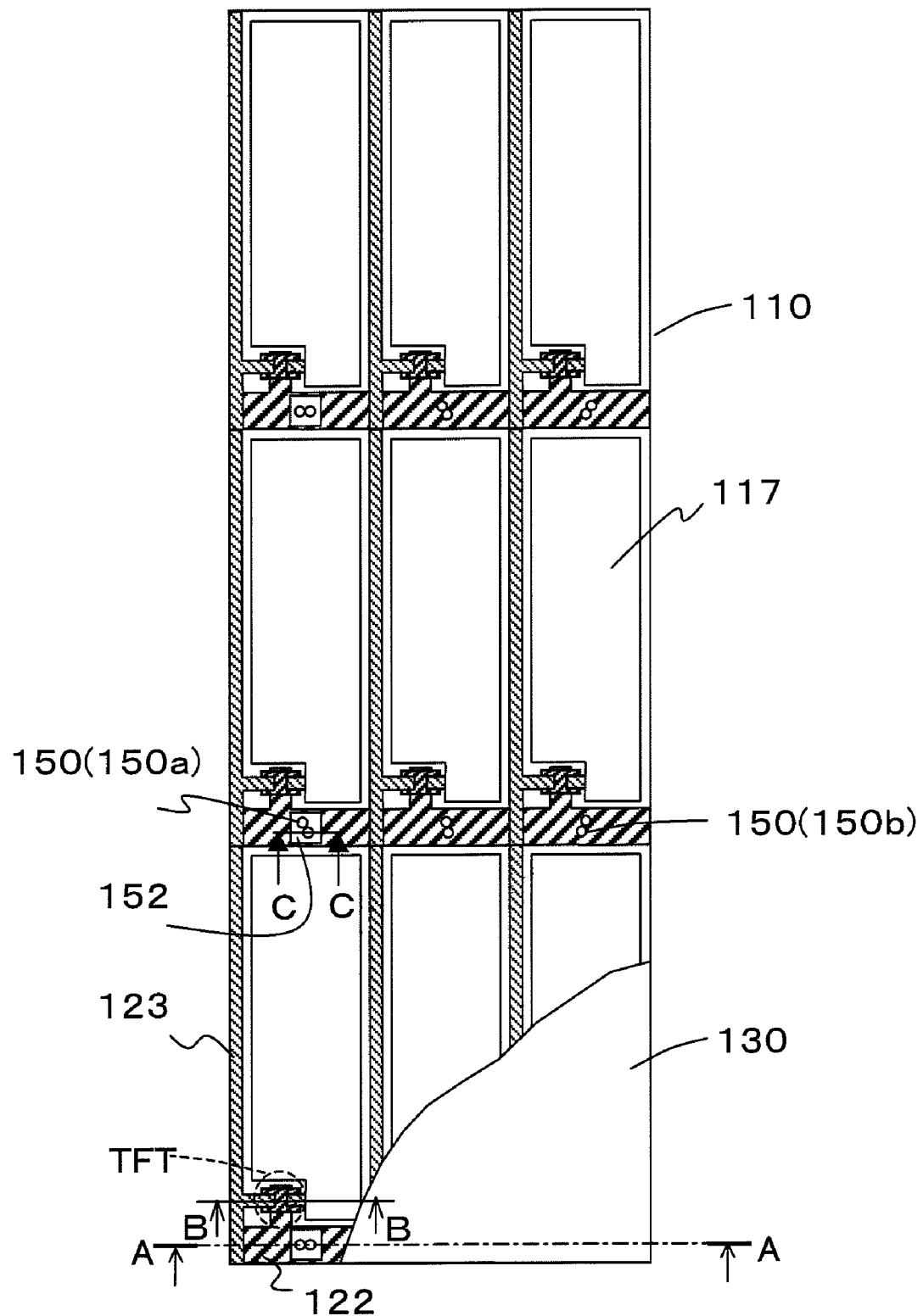
FIG. 12 is a top view showing a liquid crystal display device.
Figure 13:
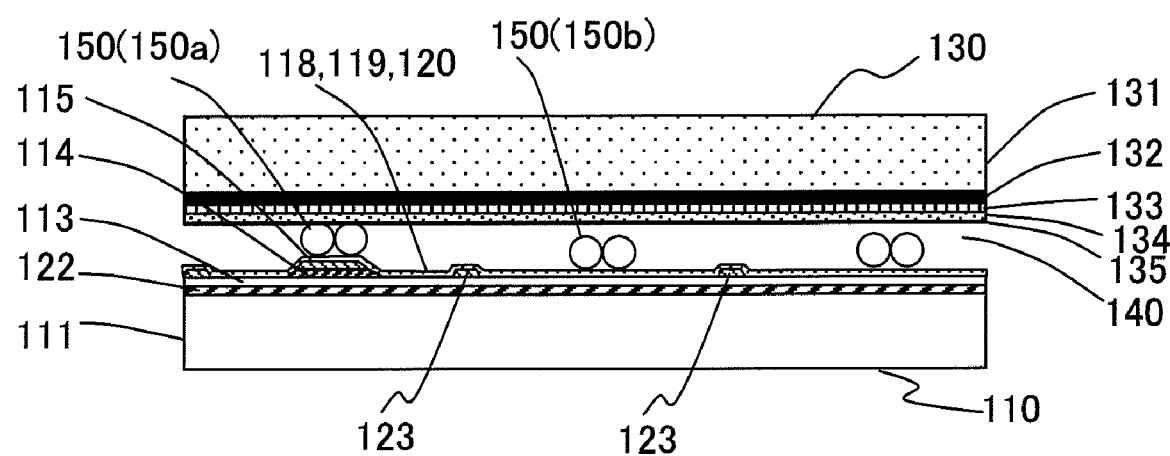
FIG. 13 is a cross sectional view taken along an A-A direction of FIG. 12.
Figure 14:
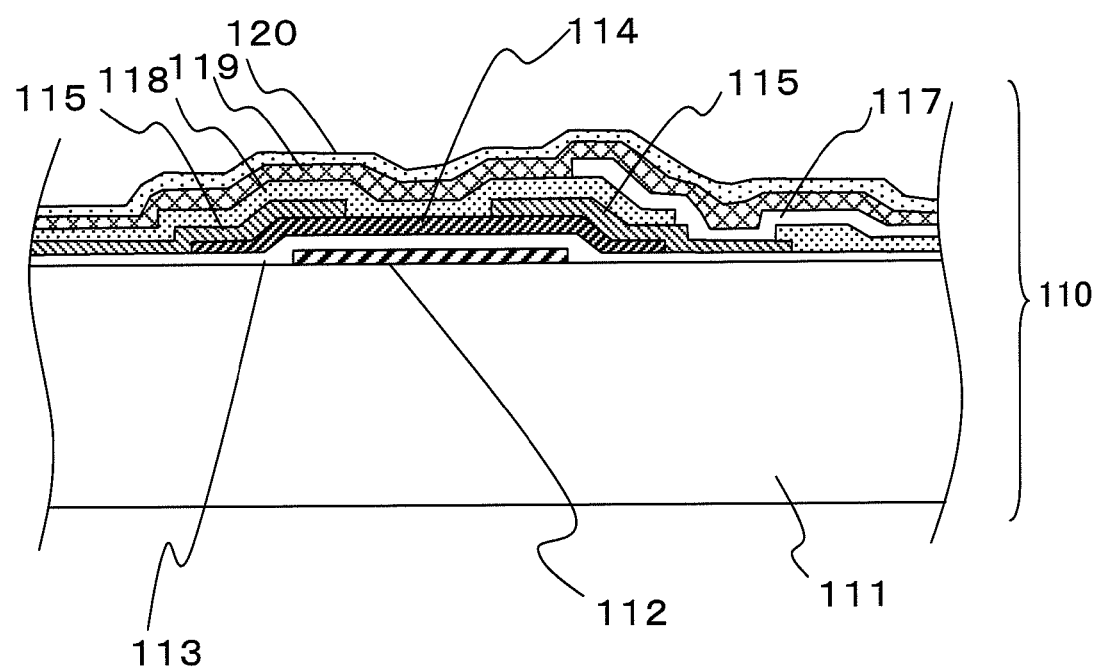
FIG. 14 is a cross sectional view taken along a B-B direction of FIG. 12.

FIG. 12 is a top surface view showing the liquid crystal display device (including nine pixels) according to this embodiment. FIG. 13 is a cross sectional view taken along an A-A' line of FIG. 12. FIG. 14 is a cross sectional view showing a TFT region and corresponds to a cross sectional view taken along a B-B' line of FIG. 12.

The liquid crystal display device according to this embodiment has a structure in which a pair of substrates 110 and 130 are bonded to each other by a liquid crystal drop method. According to the liquid crystal drop method, a liquid crystal material for forming a liquid crystal layer 140 is dropped within a closed loop of a sealing agent formed on the principal surface of one of the substrates 110 and 130 before the substrates 110 and 130 are bonded to each other. Therefore, the sealing agent for liquid crystal sealing which is provided to the periphery of a display region does not include an injection port for injecting liquid crystal. That is, the sealing agent provided to the periphery of the display region, in which the plurality of pixels as shown in FIG. 12 are two-dimensionally arranged, is formed continuously (without discontinuation) to form the closed loop. The structural feature reflects a process unique to the liquid crystal drop method.

A base substrate 131 of the color filter substrate 130 is made of borosilicic acid glass whose ion impurity amount is small and has a thickness of 0.5 mm to 0.7 mm. The color filter substrate 130 includes a color filter 132, a planarizing layer 133, a pixel electrode 134, and an alignment film 135, which are provided on the liquid crystal layer 140 side.

The color filter 132 has a structure in which a black matrix and colored resist layers of red (R), green (G), and blue (B) are repeatedly arranged in a stripe shape. Unevenness caused by the colored resist layers of the color filter 132 is flattened by the planarizing layer 133 made of resin. The pixel electrode 134 is a transparent electrode of indium tin oxide (ITO).

The alignment film 135 is an organic film of polyimide and subjected to alignment treatment using a rubbing method to align the liquid crystal layer 140 close thereto in the alignment treatment direction.

As in the case of the base substrate 131 of the color filter substrate 130, a base substrate 111 of the TFT substrate 110 is made of borosilicic acid glass and has a thickness of 0.5 mm to 0.7 mm.

The TFT substrate 110 includes the thin film transistors (TFTs) arranged on the liquid crystal layer 140 side. Each of the thin film transistors is located at an intersection between a scanning wiring 123 and a signal wiring 122 and connected with the scanning wiring 123, the signal wiring 122, and a pixel electrode 117.

As shown in FIG. 14, the thin film transistor has a reverse staggered structure including a gate layer 112, a gate insulating film 113, an amorphous silicon layer 114, and source and drain layer 115. The amorphous silicon layer 114 is included in a channel region. The gate layer 112 is connected with the signal wiring 122. The source side of the source and drain layer 115 is connected with the scanning wiring 123 and the drain side thereof is connected with the pixel electrode 117. The pixel electrode 117 is a transparent electrode of indium tin oxide (ITO) as in the case of the pixel electrode 134 opposed thereto.

A planarizing layer (protective film) 119 and an alignment film 120 are laminated on the above-mentioned layers. As in the case of the alignment film 135 of the color filter substrate 130, the alignment film 120 is provided close to the liquid crystal layer 140 and specifies the alignment direction thereof.

When a voltage is applied between the opposed pixel electrodes 117 and 134, an electric field is produced therebetween, thereby changing the orientation of the liquid crystal layer 140.

Next, the spacers for suitably holding a distance between the TFT substrate 110 and the color filter substrate 130 will be described.

In the liquid crystal display device according to this embodiment, bead spacers 150 each of which is a spherical elastic spacer are disposed between the two substrates.

The bead spacers 150 are disposed above the signal wiring 122 so as not to obstruct pixels. The bead spacers 150 include bead spacers 150a with mount and bead spacers 150b with no mount. The bead spacers 150a are equal in size (diameters) to the bead spacers 150b.

Figure 15:
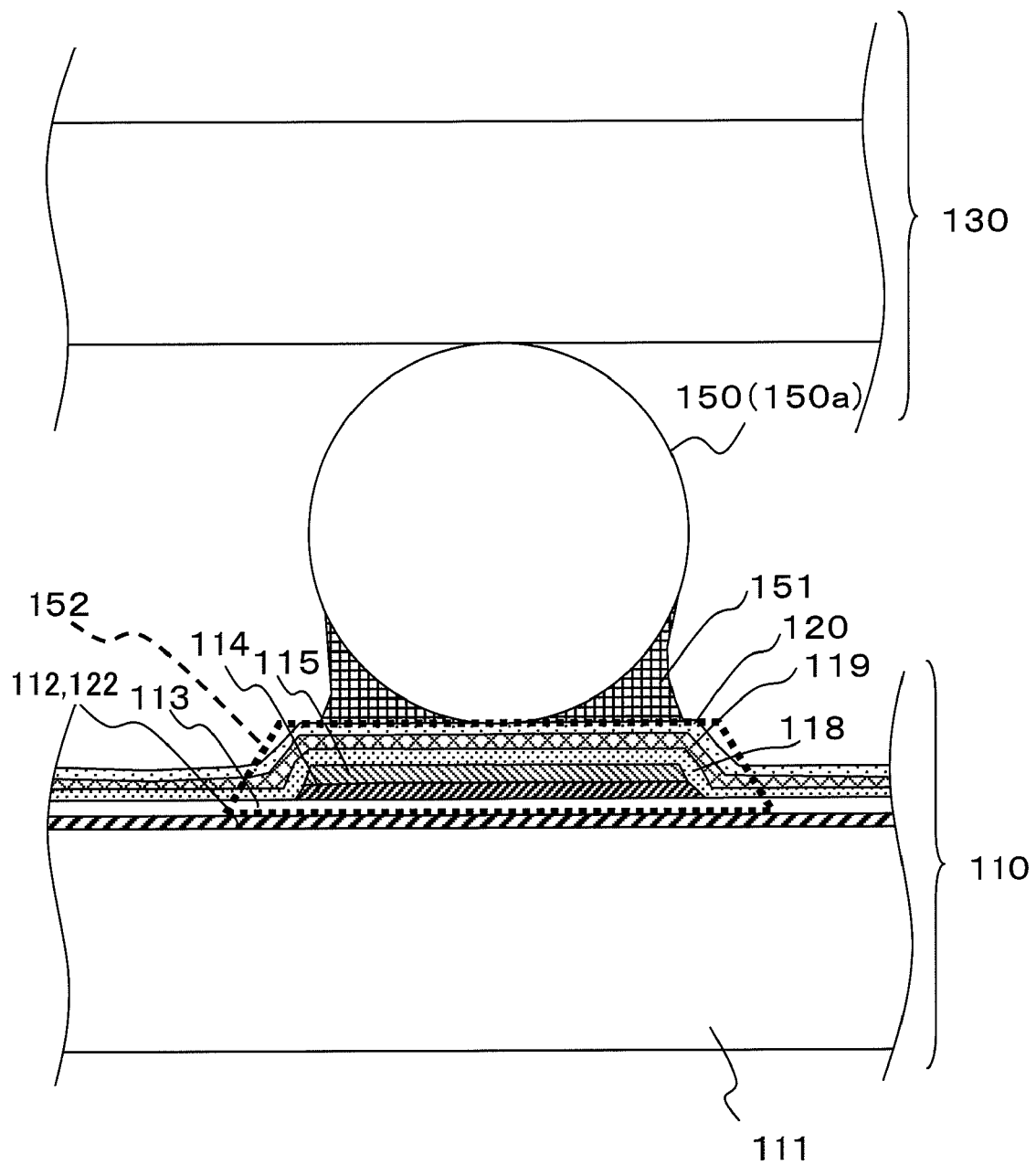
FIG. 15 is a cross sectional view taken along the C-C direction of FIG. 12.

FIG. 15 is a cross sectional view showing a corresponding region of the bead spacers with mount, which is a cross sectional view taken along a C-C' line of FIG. 12. This corresponds to an enlarged view showing a region of the spacers 150a with mount in FIG. 13. In FIG. 15, a width of a mount layer 152 corresponds to substantially one of the bead spacers 150. However, the present invention is not limited thereto. The width of the mount layer 152 may be a size capable of disposing the plurality of bead spacers 150.

As shown in FIG. 15, the mount layers 152 for raising the bead spacers 150 in level are provided on the signal wiring 122 of the TFT substrate 110 at predetermined intervals (for example, an interval corresponding to three pixels of R, G, and B). Each of the mount layers 152 is formed so as to rise toward the color filter substrate 130 as compared with the peripheral region. The rise is caused by the amorphous silicon layer 114 and the source and drain layer 115. The layers 114 and 115 are formed simultaneously during the formation of the amorphous silicon layer 114 and the source and drain layer 115 in a thin film transistor forming process. That is, the layers included in the mount layer 152 are made of the same materials as those of parts of the layers included in the thin film transistor.

As described above, the bead spacers 150a and 150b are disposed above the signal wiring 122 (gate layer 112). The amorphous silicon layer 114 (semiconductor layer) and the source and drain layer 115 (electrode layers made of, for example, metal or alloy) provided above the gate layer 112 to form the thin film transistor are laminated in this order on the gate insulating film 113 in the position in which the bead spacer 150a is disposed. It is unnecessary to form the amorphous silicon layer 114 and the source and drain layer 115 above the signal wiring 122 (gate layer 112) within the principal surface of the TFT substrate 110, particularly, within the display region in which the plurality of pixels are two-dimensionally arranged as shown in FIG. 1A, except the region in which the thin film transistor is formed. However, in this embodiment, the amorphous silicon layer 114 and the source and drain layer 115 are also provided in a region outside of the region in which the thin film transistor is formed. Therefore, a lamination structure observed in a source region or a drain region (see FIG. 14) of the thin film transistor corresponds to the mount layer 152 of the bead spacer 150a as shown in FIG. 15.

In FIG. 15, the mount layer 152 is raised in level by the thickness of the amorphous silicon layer 114 and the thickness of the source and drain layer 115. However, the present invention is not limited thereto. The mount layer 152 may be raised in level by one of the thickness of the amorphous silicon layer 114 and the thickness of the source and drain layer 115.

The mount layer 152 raised in level by only the amorphous silicon layer 114 has the same lamination structure as the channel region (region sandwiched by the source region and the drain region) of the thin film transistor (see FIG. 14). The mount layer 152 raised in level by only the source and drain layer 115 has the same lamination structure as the source electrode or the drain electrode (which is also called a "lead electrode" led to the signal wiring 122 or the pixel electrode 117) of the thin film transistor which is led from the source region or the drain region of the thin film transistor to the opposite side of the channel region. The lamination structure of the mount layer 152 shown in FIG. 15 includes the gate insulating film 113 electrically insulating the signal wiring 122 (gate layer 112) from the amorphous silicon layer 114 or the source and drain layer 115, an interlayer insulating film 118 which covers the source and drain layer 115 and on which the pixel electrode 117 is formed, the planarizing film 119 which covers all the above-mentioned films and reduces the unevenness on the principal surface of the TFT substrate 110 which is caused by all the films, and the alignment film 120 which is formed on the planarizing film 119 and is contact with the liquid crystal layer 110. Each of the gate insulating film 113, the interlayer insulating film 118, the planarizing film 119, and the alignment film 120 is formed over the entire display region including the positions in which the bead spacers 150b are disposed.

The bead spacers 150 are disposed in both the region which includes the mount layer 152 and the region which does not include the mount layer 152 in the predetermined positions. The bead spacers 150 can be formed by application using an inkjet method. An adhesive to which beads corresponding to a material of the bead spacers 150 are dispersed is used as an application liquid. The spacer material is applied by dot jet from a nozzle of an ink jet type head to the TFT substrate 110 to which the alignment film 120 is formed. Because the ink jet type is employed, the bead spacers 150 can be easily disposed in the desired positions. As shown in FIG. 15, when an adhesive 151 is cured, the bead spacers 150 are held.

Next, a function of the bead spacer 150a with mount and a function of the bead spacer 150b with no mount will be described with reference to FIGS. 16A, 16b, and 16C.

Figure 16A:
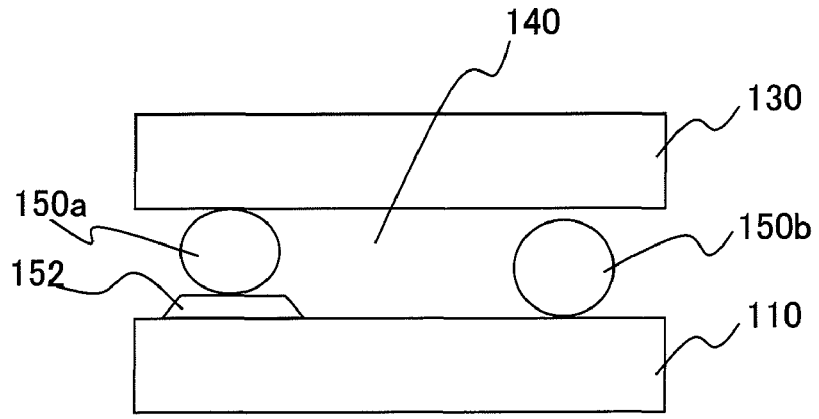
FIGS. 16A, 16B, and 16C are explanatory views showing a function of the spacers.
Figure 16B:
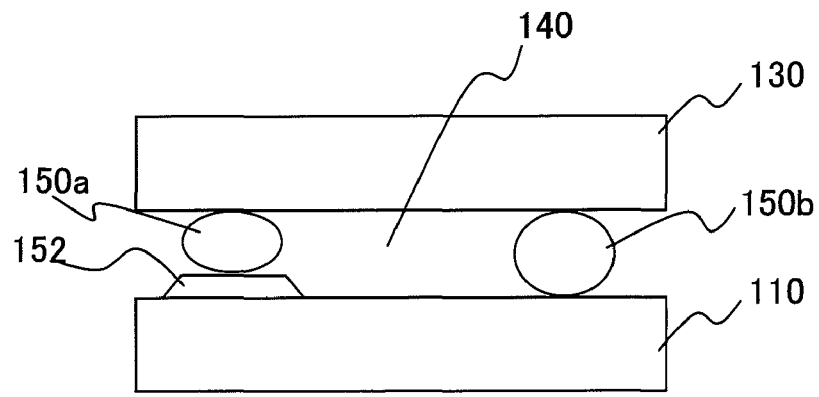

FIG. 16A shows a normal state (for example, a state in which there is no excessive pressure from the outside at room temperature). FIG. 16B shows a state in which the excessive pressure is applied to narrow a gap between two substrates. FIG. 16C shows a state in which the gap between the two substrates is widened by the thermal expansion of a liquid crystal layer.

When the liquid crystal display device according to this embodiment is to be manufactured, the bead spacers 150 are disposed and then the TFT substrate 110 and the color filter substrate 130 are bonded to each other to sandwich the liquid crystal layer. In this case, the two substrates are bonded to each other with the distance between the substrates is adjusted, such that in a normal state as shown in FIG. 16A, the bead spacer 150a with mount is in contact with the color filter substrate 130 and becomes slightly flat, and furthermore the bead spacer 150b with no mount can be maintained in an original spherical shape without contact with the color filter substrate 130.

For example, it is assumed that an original bead diameter is 4 μm and a mount thickness is 1 μm. When the distance between the substrates is set to approximately 4.2 μm to 4.7 μm, the bead spacer 150a with mount becomes slightly flat. A gap of 0.2 μm to 0.7 μm is ensured between the bead spacer 150b with no mount and the color filter substrate 130, so the bead spacer 150b with no mount can be maintained in the original spherical shape.

In the liquid crystal display device produced as described above, as shown in FIG. 16B, there is the case where the excessive pressure is applied to the TFT substrate 110 or the color filter substrate 130. In this case, the bead spacer 150a disposed on the mount layer 152 is further flattened by elastic deformation thereof. When the pressing pressure is further applied, the bead spacer 150b with no mount which is not in contact with the color filter substrate 130 in the normal state is brought into contact with the color filter substrate 130. Then, the bead spacer 150b with no mount resists the pressing pressure together with the bead spacer 150a with mount undergoing elastic deformation thereof. In such a case, the peripheral bead spacers 150a and 150b also resist the pressing pressure. That is, a force opposing the pressing pressure increases, so significant flattening can be prevented. Therefore, the gap between the substrates can be sufficiently ensured.

Note that, when the mount is provided for each of the bead spacers, an initial force opposing the pressing pressure can be increased. However, this case is not preferable because a friction resistance caused when the two substrates are shifted in position from each other in the plane direction becomes excessively large. According to this embodiment, only the bead spacer 150a with mount normally has the gap holding function, so the friction resistance between the TFT substrate 110 and the color filter substrate 130 can be significantly reduced. Even when the color filter substrate 130 is shifted in position from the TFT substrate 110 in the plane direction, the color filter substrate 130 easily returns to an original position because of restoring force. As a result, it is possible to avoid the occurrence of the unevenness of brightness which is caused by the shifted state.

When no excessive pressure is applied as in the normal state, the number of contacts between the spacers and the substrate is reduced by the level raising effect of the bead spacer 150a with mount. Therefore, the elastic effect of the spacers is increased, with the result that an increase of process margin in the bonding process of the substrates can be expected.

Figure 16C:
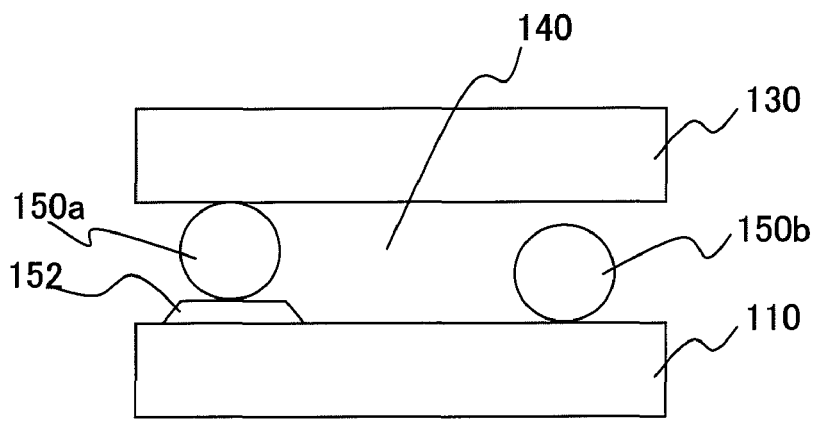

As shown in FIG. 16C, there is the case where the gap between the substrates is wider than in the normal state by the thermal expansion of the liquid crystal. Even in such a case, the bead spacer 150a with mount is brought into contact with the color filter substrate 130 until the bead spacer 150a with mount returns from the flattened state to the original spherical shape. Therefore, the bead spacer 150a with mount can act as a spacer holding a constant gap width.

In order to realize such an effect, assume that there is the thermal expansion of the liquid crystal in the case where the liquid crystal display device is normally used. In this case, even when the gap between the substrates is widened, the thickness of the mount layer 152, the size of the spacer, and the gap width is adjusted as appropriate such that the bead spacer 150a with mount is brought into contact with the color filter substrate 130 to act as a spacer.

The second embodiment has been described as above.

According to the above embodiment, the spacers can be formed in view of a reduction in manufacturing cost and improvement of manufacturing margin for a non-defective product.

According to the present invention, various modifications can be made. For example, when a predetermined concave and convex pattern is formed on a predetermined area of a substrate, a region that includes a mount portion and a portion with no mount which are close to each other is produced. The spacers are applied to the portions by an ink jet method. Therefore, the bead spacers with mount and the bead spacers with no mount can be formed corresponding to the pattern at a predetermined ratio.

Figure 17:
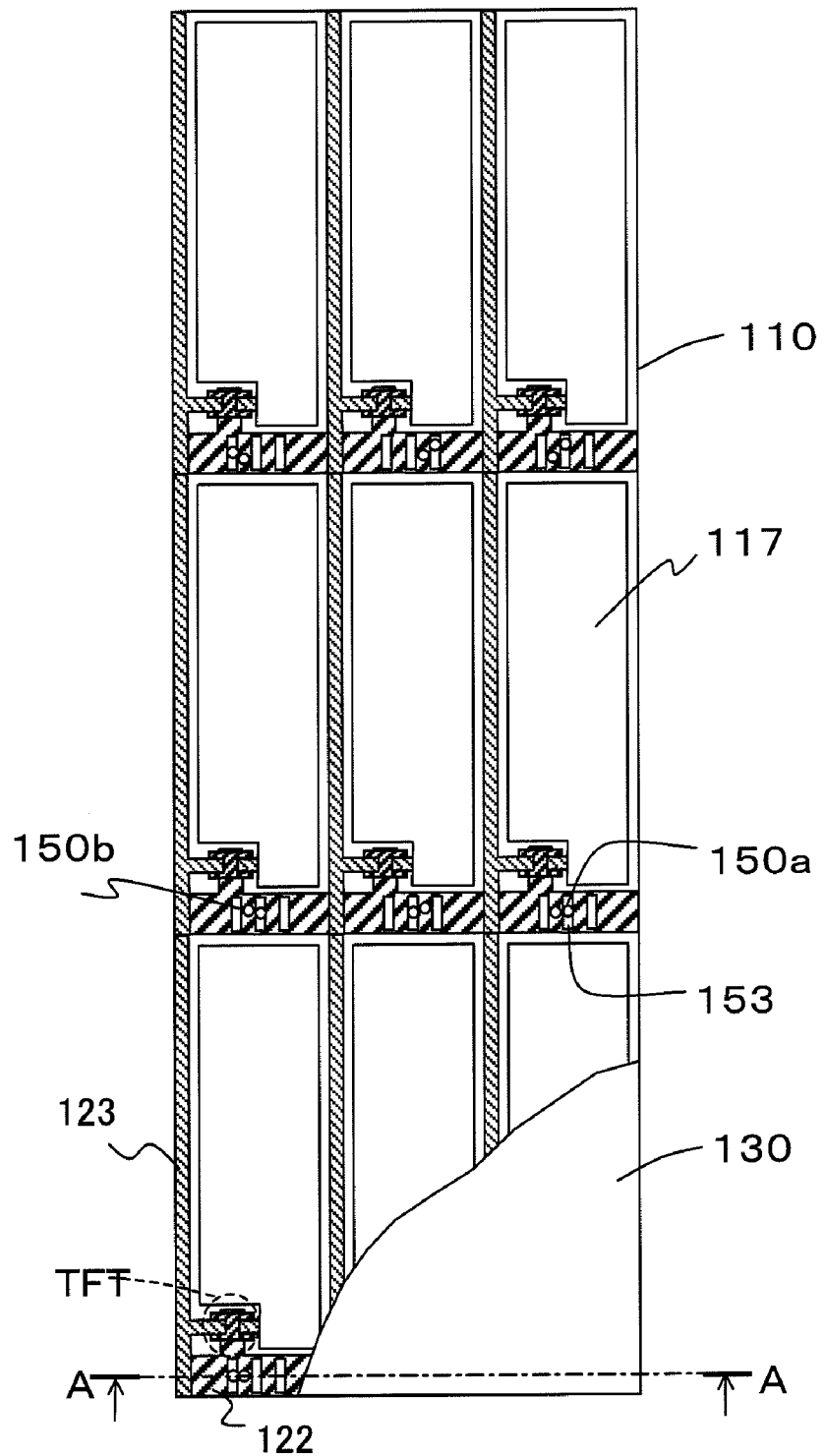
FIG. 17 is a top view showing a liquid crystal display device.

For example, as shown in FIG. 17, bar-shaped mount layers 153 are provided on the signal wiring 122 at predetermined intervals. The mount layers 153 are disposed in an uneven shape of line-and-space corresponding to the diameter of the bead spacer. That is, a width of each of the mount layers 153 and an interval therebetween is set to approximately the diameter of each of the bead spacers 150.

Figure 18:
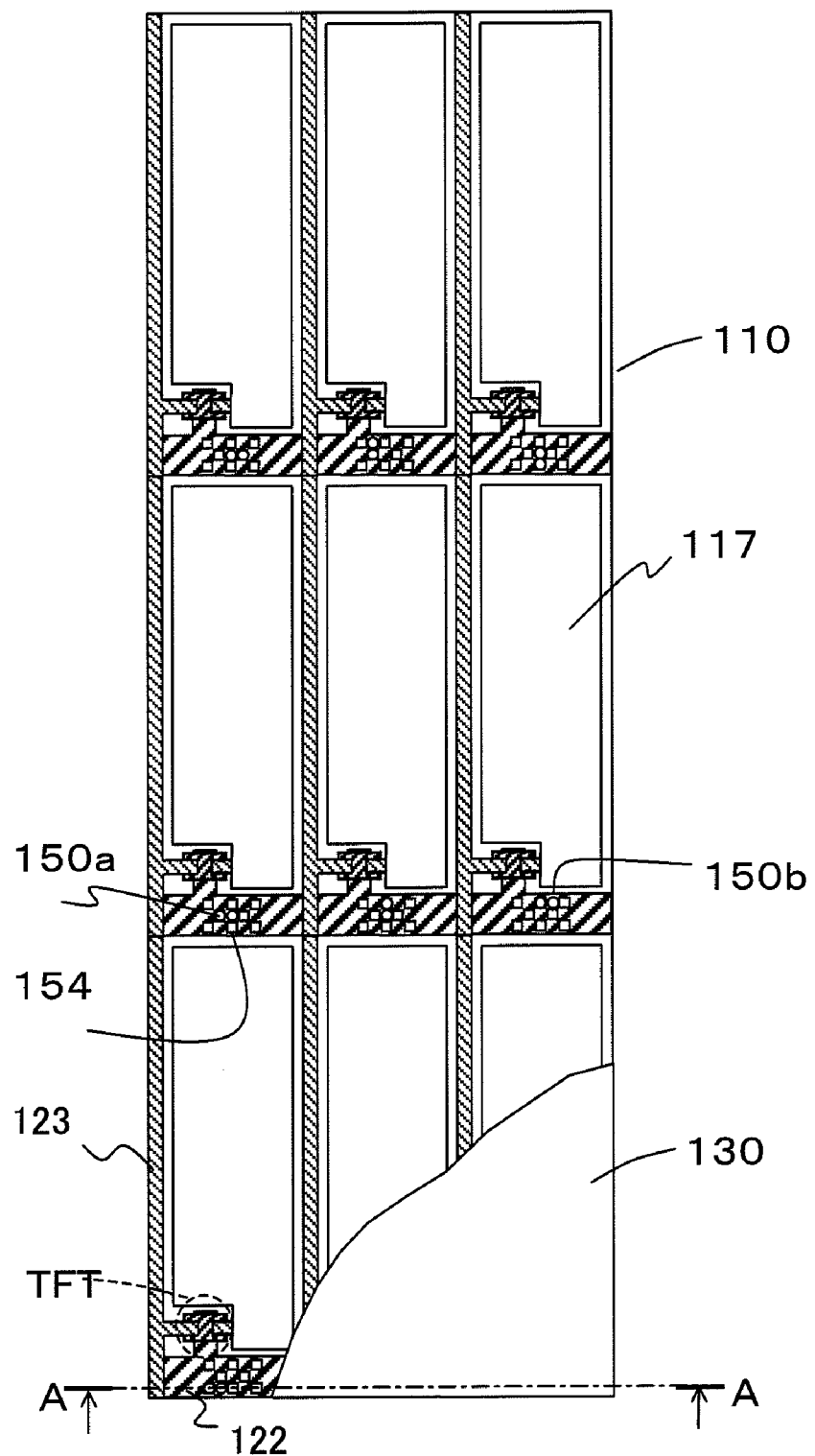
FIG. 18 is a top view showing a liquid crystal display device.

As shown in FIG. 18, mount layers 154 are disposed in a check shaped pattern of line-and-space corresponding to the diameter of each of the bead spacers 150.

Figure 19:
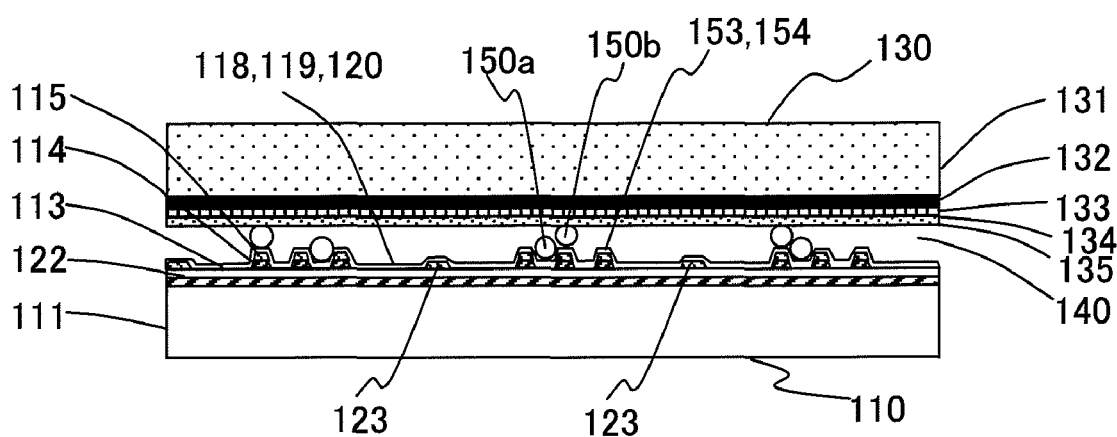
FIG. 19 is a cross sectional view showing the liquid crystal display device taken along an A-A direction of FIG. 17 or 18.

FIG. 19 is a cross sectional view showing the liquid crystal display device taken along an A-A' line of FIG. 17 or 18.

In a region including the mount layer 153 or 154, the bead spacer 150a exhibits the function obtained by level raising by the amorphous silicon layer 114 and the source and drain layer 115. The function is described above.

Note that the mount layers 153 and 154 may be raised in level by one of the thickness of the amorphous silicon layer 114 and the thickness of the source and drain layer 115.

As described above, in the case where the pattern, in which the ratio between the concave portion and the convex portion is adjusted as appropriate, is formed and the spacers are disposed on the formed pattern, even when a dispersion solution of spacer members is roughly applied, the spacers which are located on the mounts and the spacers which are not located on the mounts can be provided at a desired ratio.

In the above embodiment, the spacers are bonded to the TFT substrate 110 side. The present invention is not limited thereto. The spacers may be bonded to the color filter substrate 130 side.

The second embodiment of the present invention can be applied to various types of liquid crystal display devices. For example, the second embodiment can be also applied to the in-plane switching (IPS) type liquid crystal display device whose liquid crystal layer is applied with a lateral electric field. The second embodiment can be also applied to the translucent IPS type liquid crystal display device in which each pixel includes a transmission display region and a reflection display region.

What is claimed is:

1. A liquid crystal display device, comprising:
a pair of substrates, which are bonded so that principal surfaces thereof are opposed to each other across an intervening gap;
a plurality of bead spacers, which are prepared separately from each of the pair of substrates and disposed between the principal surfaces of the pair of substrates; and
a liquid crystal layer in which the gap is filled with liquid crystal molecules; wherein
one of the pair of substrates includes a display screen of the liquid crystal display device on a side opposite the principal surface of the one of the pair of substrates, and the display screen includes a plurality of pixels, arranged two-dimensionally, in each of which light transmittance of the liquid crystal layer is controlled;
the plurality of bead spacers are disposed in a region of at least one of the principal surfaces of the pair of substrates, the region being opposed to a non-display portion arranged between the plurality of pixels of the display screen;
an alignment film which aligns the liquid crystal molecules, and an organic film which is different in composition from the alignment film and is covered with the alignment film in the region are formed on the at least one of the principal surfaces of the pair of substrates; and
the plurality of bead spacers is adhered to each of the alignment film and the organic film and held in the region; and wherein:
the alignment film and the organic film are formed of the same resin film; and
the alignment film and the organic film are different from each other in at least one of: an organic substance, which is contained in the resin film and is different from the resin film, and a content ratio of the organic substance.

2. A liquid crystal display device according to claim 1, wherein the organic film includes one of an organic substance having a higher surface tension than an organic substance contained in the alignment film, and organic molecules derived from the organic substance.

3. A liquid crystal display device according to claim 1, wherein:
the alignment film further includes a first organic substance and a second organic substance which are different from the resin film which forms the alignment film;
the first organic substance comprises one of a first organic solvent and organic molecules derived from the first organic solvent;
the second organic substance comprises one of a second organic solvent having a higher surface tension than the first organic solvent, and organic molecules derived from the second organic solvent; and
the organic film includes a first organic substance and a second organic substance and a ratio of the second organic substance to the first organic substance in the organic film is higher than a ratio of the second organic substance to the first organic substance in the alignment film.

4. A liquid crystal display device according to claim 3, wherein the alignment film is formed by curing a precursor solution which contains the first organic solvent and the second organic solvent.

5. A liquid crystal display device, comprising:

a pair of substrates which are bonded so that principal surfaces thereof are opposed to each other across an intervening gap;

a plurality of bead spacers which are prepared separately from each of the pair of substrates and disposed between the principal surfaces of the pair of substrates; and a liquid crystal layer in which the gap is filled with liquid crystal molecules; wherein one of the pair of substrates includes a display screen of the liquid crystal display device, on a side opposite the principal surface of the one of the pair of substrates, and the display screen includes a plurality of pixels, arranged two-dimensionally, in each of which light transmittance of the liquid crystal layer is controlled;

an alignment film which aligns the liquid crystal molecules is formed on at least one of the principal surfaces of the pair of substrates; and the plurality of bead spacers is disposed in a region which is located on the alignment film and opposed to a non-display portion provided between the plurality of pixels of the display screen, is adhered to an organic film which is different in composition from the alignment film and is adhered to the alignment film in the region, and held in the region; and wherein:

the alignment film and the organic film are formed of the same resin film; and the alignment film and the organic film are different from each other in at least one of: an organic substance, which is contained in the resin film and is different from the resin film, and a content ratio of the organic substance.

* * * * *